United States Patent
Peters et al.

(10) Patent No.: US 8,830,138 B2
(45) Date of Patent: Sep. 9, 2014

(54) MULTILAYER FILM ELEMENT

(75) Inventors: John Anthony Peters, Au-Zurich/Schweiz (CH); Christian Schumacher, Furth (DE); Ulrich Schindler, Furth (DE)

(73) Assignee: LEONHARD KURZ Stiftung & Co. KG, Furth (DE)

( * ) Notice: Subject to any disclaimer, the term of this patent is extended or adjusted under 35 U.S.C. 154(b) by 575 days.

(21) Appl. No.: 13/143,005

(22) PCT Filed: Jan. 4, 2010

(86) PCT No.: PCT/EP2010/000005
§ 371 (c)(1),
(2), (4) Date: Sep. 7, 2011

(87) PCT Pub. No.: WO2010/076335
PCT Pub. Date: Jul. 8, 2010

(65) Prior Publication Data
US 2012/0001823 A1    Jan. 5, 2012

(30) Foreign Application Priority Data
Jan. 5, 2009   (DE) .......................... 10 2009 004 130

(51) Int. Cl.
*H01Q 21/00*   (2006.01)
(52) U.S. Cl.
USPC .......................................... 343/867; 343/742
(58) Field of Classification Search
USPC ........... 343/867, 742, 700 MS, 824, 853, 895
See application file for complete search history.

(56) References Cited

U.S. PATENT DOCUMENTS

| 4,598,276 | A | 7/1986 | Tait |
| 5,291,180 | A | 3/1994 | Reeb |
| 6,622,921 | B2 | 9/2003 | Altwasser |
| 7,136,023 | B2 * | 11/2006 | Reykowski .................... 343/742 |
| 7,453,360 | B2 | 11/2008 | Glaser |
| 7,750,852 | B2 * | 7/2010 | Hanaoka et al. ........ 343/700 MS |
| 8,384,601 | B2 * | 2/2013 | Hanaoka et al. ........ 343/700 MS |
| 2007/0170505 | A1 * | 7/2007 | Tokunaga ...................... 257/347 |
| 2008/0198314 | A1 * | 8/2008 | Murade .......................... 349/111 |
| 2010/0182211 | A1 | 7/2010 | Peters |
| 2011/0285494 | A1 * | 11/2011 | Jeong et al. .................... 336/200 |

FOREIGN PATENT DOCUMENTS

| DE | 19601358 | 7/1996 |
| DE | 102004034768 | 2/2006 |
| DE | 102007027838 | 12/2008 |
| EP | 0142380 | 5/1985 |
| EP | 0704928 | 4/1996 |
| EP | 0967568 | 12/1999 |
| EP | 1179811 | 2/2002 |

(Continued)

*Primary Examiner* — Thien M Le
(74) *Attorney, Agent, or Firm* — Hoffmann & Baron, LLP

(57) ABSTRACT

A multilayer film element and a method for producing the same. The multilayer film element includes a flexible dielectric carrier layer having a layer thickness of less than 800 μm and has a first electrically conductive layer, in which a first coil-shaped conductor track is shaped in a first region of the film element, and a second electrically conductive layer, in which a second coil-shaped conductor track is shaped in the first region. The dielectric carrier layer is arranged between the first and second electrically conductive layers, and the first and second conductor tracks overlap at least in regions and are coupled to one another to form an antenna structure.

53 Claims, 12 Drawing Sheets

(56) References Cited

FOREIGN PATENT DOCUMENTS

| | | |
|---|---|---|
| JP | H11-167612 A | 6/1999 |
| JP | 2001-291082 A | 10/2001 |
| JP | 2002-49899 A | 2/2002 |
| JP | 2002-74298 A | 3/2002 |
| JP | 2002-366915 A | 12/2002 |
| JP | 2004-13427 A | 1/2004 |
| JP | 2004-206479 A | 7/2004 |
| JP | 2005-326623 A | 11/2005 |
| JP | 2007-306610 A | 11/2007 |
| WO | WO2005/093900 A | 10/2005 |

* cited by examiner

MULTILAYER FILM ELEMENT

This application claims priority based on an International Application filed under the Patent Cooperation Treaty, PCT/EP2010/000005, filed on Jan. 4, 2010 and German Application No. DE 102009004130.3, filed on Jan. 5, 2009.

BACKGROUND OF THE INVENTION

The invention relates to a multilayer film element comprising a flexible dielectric carrier layer and an electrically conductive layer, and to a method for producing such a film element.

DE 19 601 358 C2 describes a security document in which a chip is introduced into the paper pulp of a banknote, said chip being provided with an antenna. For reasons of mechanical stability, the chip is in this case laminated onto a carrier, which is a metalized film.

EP 1 179 811 A1 describes fixing a security element on the paper carrier of a banknote by means of an adhesive layer, said security element having a substrate layer and a metal layer. In this case, the metal layer forms a looped antenna, which is connected to an integrated circuit. Data stored in the integrated circuit can then be read out by means of the antenna.

SUMMARY OF THE INVENTION

The invention is based on the object, then, of producing and providing a film element which can be produced cost-effectively and with little material consumption and nevertheless has an antenna structure having an improved quality factor and reduced deviation of antenna parameters from predefined reference values.

This object is achieved by a multilayer film element comprising a flexible dielectric carrier layer having a layer thickness of less than 800 µm, said film element comprising a first electrically conductive layer, in which a first coil-shaped conductor track is shaped in a first region of the film element, and comprising a second electrically conductive layer, in which a second coil-shaped conductor track is shaped in the first region, wherein the dielectric carrier layer is arranged between the first and second electrically conductive layers and the first and second conductor tracks overlap at least in regions and are coupled to one another to form an antenna structure, and wherein a first conductor track section comprising at least a three-quarter turn of the first coil-shaped conductor track overlaps at least in regions a second conductor track section comprising at least a three-quarter turn of the second coil-shaped conductor track with respect to a direction perpendicular to the plane spanned by the carrier layer. This object is furthermore achieved by a method for producing a multilayer film element, wherein a flexible dielectric carrier layer having a layer thickness of less than 800 µm is provided, a first electrically conductive layer, in which a first coil-shaped conductor track having a first conductor track section comprising at least a three-quarter turn of the coil-shaped first conductor track is shaped in a first region of the film element, is applied on a first surface of the carrier layer, wherein a second electrically conductive layer, in which a second coil-shaped conductor track having a second conductor track section comprising at least a three-quarter turn of the second coil-shaped conductor track is shaped in the first region, is applied to a second surface of the carrier layer, said second surface lying opposite the first surface, in such a way that the first and second conductor track sections overlap at least in regions and are coupled to one another to form an antenna structure, and the first conductor track section overlaps at least in regions the second conductor track section with respect to a direction perpendicular to the plane spanned by the carrier layer. The shaping of the coil-shaped conductor tracks and also the overlap thereof with respect to the direction perpendicular to the plane spanned by the carrier layer are in this case configured, in particular, in such a way that the area dimensionings of the overlap area of the first and second conductor track sections upon an (imaginary) displacement of the first coil-shaped conductor track relative to the second coil-shaped conductor track in a first direction, lying in the plane spanned by the carrier layer, by 100 µm remains constant.

The film element according to the invention is suitable, in particular, for mass-produced products such as RFID tags, credit cards, smart cards, passports and the like, which require cost-effective production in conjunction with a small space requirement.

In accordance with one preferred exemplary embodiment of the invention, the first conductor track section completely overlaps the second conductor track section in a region comprising t turns of the first conductor track section. Furthermore, in this region along the first conductor track section, the extent of the second conductor track in at least one first direction, lying in the plane spanned by the carrier layer, is less than the extent of the first conductor track by the value r where $t \geq \frac{1}{4}$ and $r \geq 100$ µm. Preferably, in this case the (entire) first conductor track section completely overlaps the second conductor track section with respect to the direction perpendicular to the plane spanned by the carrier layer and, along the (entire) first conductor track section, the extent of the second conductor track in the first direction is less than the extent of the first conductor track at least by 100 µm.

It has surprisingly been found that in the case of such a configuration of a multilayer film element in comparison with a conventional spiral antenna structure, for a predefined resonant frequency with the same consumption of electrically conductive material, the quality factor of the antenna structure can be improved by approximately 80%. Furthermore, the deviation of the resonant frequency of the antenna structure of the produced film elements from the predefined target resonant frequency is also significantly reduced and the influencing of the resonant frequency by fluctuations of the input capacitance of the electrical circuits connected to the antenna structure is also significantly reduced. By virtue of the capacitive coupling of the first and second conductor track sections, the specific relative dimensioning of the first and second conductor track sections with respect to one another and the specific arrangement thereof with respect to one another, in this case possible tolerances and/or register deviations that occur during the production process when applying and structuring the first and second electrically conductive layers are brought under control and the quality factor is furthermore improved for the same material consumption, as described above.

Along the first conductor track, in the first direction, the extent of the second conductor track is preferably between 200 and 400 µm less than the extent of the first conductor track. The extent of the second conductor track in the first direction is further preferably between 98% and 99.9% of the extent of the first conductor track, as viewed along the first conductor track section.

In accordance with a further preferred exemplary embodiment of the invention, the extent of the second conductor track along the first and/or second conductor track section is less than that of the first conductor track not only in the first direction but also in a second direction. Thus, along the first and/or second conductor track section in the second direction, which likewise lies in the plane spanned by the carrier layer and which forms a right angle with the first direction, the extent of the second conductor track is preferably at least 50 µm less than the extent of the first conductor track. This affords further advantages with regard to low variation of the resonant frequency of the antenna structure of the produced film elements and also with regard to the quality factor thereof. The resonant frequency and the quality factor are in each case determined by the capacitance and inductance formed by the first and second conductor tracks. As a result of the largely constant overlap of the first and second conductor tracks, the capacitance and inductance likewise remain largely constant, which thereby results in low variation of the resonant frequency and of the quality factor of the antenna structure of the produced film elements. Furthermore, it has proved worthwhile in this case for, along the first conductor track section in the first direction, the extent of the second conductor track to be between 200 µm and 400 µm less than the extent of the first conductor track. It is thus advantageous if the conductor track width of the first conductor track along the first conductor track section is between 200 and 400 µm less than the conductor track width of the second conductor track along the second conductor track section.

Further advantages can be achieved if, along a first conductor track section, the difference in the extent of the first and second conductor tracks in the first direction is greater, in particular more than 20% greater, than the difference in the extent of the first and second conductor tracks in the second direction.

In accordance with a further preferred exemplary embodiment of the invention, in a region comprising t turns of the first conductor track section, the first conductor track section in each case partly overlaps at least two partial sections of the second conductor track section, wherein the two partial sections are assigned to different turns of the second coil-shaped conductor track and t≥¼. In such a configuration of the film element, therefore, two adjacent turns of the second coil-shaped conductor track are capacitively coupled via the first conductor track section of the first coil-shaped conductor track, to be precise in the form of a series circuit comprising two capacitances. In this case, the first capacitance is formed by the overlap area of one partial section of the second conductor track section and the first conductor track section and the second capacitance is formed by the overlap area of the other partial section of the second conductor track section and the first conductor track section. These two capacitances, designated hereinafter as C1 and C2, jointly form a total capacitance C, wherein C is calculated in accordance with the series interconnection of the capacitances as follows:

$C=C1*C2/(C1+C2)$.

This embodiment is particularly advantageous for antennas that require a comparatively high resonant frequency, in particular of more than 16 MHz, in combination with a high bandwidth. The configuration of the film element as described above makes it possible to obtain, with little consumption of electrically conductive material, an antenna having a comparatively high inductance and comparatively low capacitance (as a result of the series circuit formed by the partial capacitances) which satisfies the above-described requirements particularly well. Furthermore, the use of a carrier layer composed of a material having a high dielectric constant, such as polycarbonate (PC), for example, is also particularly advantageous here.

It is furthermore particularly advantageous that, in the region in which the first conductor track section overlaps two partial sections of the second conductor track section, the distance between the two partial sections of the second conductor track section is less than the width of the first conductor track section by at least a value r, and furthermore preferably, in said region, the sum of the widths of the two partial sections of the second conductor track section and the distance between the partial sections is greater than the width of the first conductor track section by at least the value r, where r≥100 µm. Furthermore, the width of each partial section should preferably be chosen to be greater than or equal to the value r. This specific configuration of the first and second coil-shaped conductor tracks in said region and the specific arrangement of the first and second coil-shaped conductor tracks in said region with respect to one another afford the advantage that register deviations that possibly occur during the production process when applying and structuring the first and second electrically conductive layers are brought under control and consequently—in conjunction with material consumption of electrically conductive material that is also reduced further overall—the reject rate can be significantly decreased.

In accordance with a further preferred exemplary embodiment, in a region comprising t turns of the first conductor track section, the first and second conductor track sections partly overlap along the first conductor track section and the external diameters of the respective turns of the first coil-shaped conductor track and of the second coil-shaped conductor track differ along the first conductor track section by the value r, preferably by the value r in at least one first direction, wherein the at least one first direction lies in the plane spanned by the carrier layer. This means that in said region for each point of the first conductor track section in said region in which the first and second conductor track sections overlap, the abovementioned condition holds true, i.e. that turn of the first coil-shaped conductor track which is to be assigned to said point and that turn of the second coil-shaped conductor track which is to be assigned to said point have external diameters which differ by the value r. What is thereby achieved is that the first and second conductor track sections partly overlap on one side of the film element and likewise partly overlap on the opposite side of the film element located in the direction of the first direction with respect thereto, and the overlap in this case is inverse with respect to the first direction. Upon a relative displacement of the first and second coil-shaped conductor tracks with respect to one another in the direction of the first direction, therefore, the overlap of the first and second conductor track sections becomes smaller on one side of the film element and the overlap of the two conductor track sections becomes larger on the other side of the film element. Since the partial capacitances formed by the overlapping are additively superposed, the total capacitance thus remains the same despite the relative displacement of the first and second conductor tracks in the direction of the first direction with respect to one another. As a result of the specific choice of the width of the first and second conductor track sections in the regions in which the first and second conductor track sections partly overlap in the above sense, what is furthermore achieved is that, upon a relative displacement of the first and second coil-shaped conductor tracks by the value r in the first direction with respect to one another, the above effect is maintained and, consequently, the total capacitance of the antenna does not change.

Preferably, the film element in this case has the overlap of the first and second coil-shaped conductor tracks, as set out above, not just in two regions situated mirror-symmetrically with respect to one another, rather the first and second conductor track sections overlap over the entire length of the first conductor track section in the manner described above. This means that the first and second conductor track sections partly overlap in such a way that, along the first conductor track section, the outer contours of the first and second conductor track sections, i.e. the contours facing the edge of the film element, are always at a distance of at least the value r from one another and the width of the first and second conductor track sections is greater than 2r. The first and second conductor track sections therefore preferably consist of a coil-shaped structure, wherein the turns of the coil-shaped structure which overlap in regions are chosen such that the external diameters of the turns preferably differ by at least the value r at each location of the coil-shaped structures and the conductor track width of the coil-shaped structure is greater than twice the value r.

Furthermore, it is preferred for the width of the coil-shaped conductor track having the larger external diameter of the respective turn to be less than or equal to the width of the coil-shaped conductor track having the smaller external diameter of the respective turn. This furthermore ensures that the above-described effect that the total capacitance does not change upon displacement of the coil-shaped conductor tracks with respect to one another is ensured over a widest possible range.

The advantageous embodiments described above can also be combined with one another. Thus, it is possible, for example, for the first and second conductor track sections to be embodied so as to meet a plurality of the conditions presented above. Furthermore, it is also possible for the first and second coil-shaped conductor tracks to have a plurality of first and/or second conductor track sections which are embodied in accordance with different advantageous embodiments from among those presented above.

Furthermore, it is particularly advantageous to select t to be less than 3, to choose t≥¾ and/or to select t from the range ¾ to 1.

Furthermore, it is particularly advantageous to choose r to be less than 500 μm, in particular less than 400 μm, and to select r in particular from the range of 200 μm to 400 μm.

The first coil-shaped conductor track and the second coil-shaped conductor track preferably have the same turns direction. This enables the advantages presented above to be achieved particularly well.

In accordance with a further preferred exemplary embodiment of the invention, the first and/or second conductor track are/is substructured in the first conductor track section and/or in the second conductor track section, in particular substructured in zigzag fashion or in wavy-line-shaped fashion. This substructuring selectively influences the resistance value of the first and/or second conductor track, in order thus to increase the bandwidth of the antenna, for example. In this case, it is also possible for the substructured first or second conductor track section to overlap in regions two or more, in particular also three or more, different turns of the second or first coil-shaped structure assigned conductor track section and, in particular, to extend over them.

It is particularly advantageous to substructure the first and/or second conductor track in the first conductor track section and/or in the second conductor track section in accordance with a periodic substructuring function, wherein the period of the substructuring function is chosen to be less than 10 mm, in particular less than 5 mm. This affords the advantage that register fluctuations during the production process are largely brought under control and do not or only insignificantly influence the resonant frequency and/or bandwidth of the antenna.

In this case, a triangular function or sinusoidal function is preferably chosen as the substructuring function. The design of the first and/or second coil-shaped conductor track thus arises as a result of additive or multiplicative superposition of a macrofunction which describes the coarse structuring of the coil-shaped conductor track and defines a spiral having a specific predetermined width, for example, and the substructuring function.

It is particularly advantageous in this case if the substructuring function varies the deviation of one or both outer contours of the coil-shaped conductor track from the coarse structure. The amplitude of the substructuring function is in this case preferably between 1 mm and 10 mm, with further preference between 1.5 mm and 5 mm. In this case, amplitude is understood to mean, in particular, the maximum deviation—caused by the substructuring function—of the outer contour or outer contours of the first and/or second coil-shaped conductor track from the coarse structure or the value averaged over a period.

In accordance with one preferred exemplary embodiment of the invention, the first electrically conductive layer is applied to a first surface of the carrier layer and the second electrically conductive layer is applied to a second surface of the carrier layer, said second surface lying opposite the first surface. In this case, methods synchronized with one another are preferably used for applying and/or structuring the first and second electrically conductive layers.

It is particularly advantageous in this case if, in a first step, a structured electrically conductive base layer is in each case applied to the first and second surfaces and a plated reinforcement layer is then applied to each of the base layers in a plating bath. In this case, the plating bath can be electroless or else involve current. In this case, the electrically conductive base layer is preferably structured by means of a printing method. It is thus possible, for example, for a conductive material, for example a conductive ink, to be printed onto the first and second surfaces of the carrier substrate in the regions in which the first conductor track and the second conductor track are respectively intended to be shaped later in the first and second electrically conductive layers. Furthermore, it is also possible for the base layer, in a first step, to be applied to the first and second surfaces of the carrier layer over the whole area, e.g. as a thin metal layer by means of vapor deposition, and then for an etching resist to be printed in the regions in which the first or second conductor track is intended to be shaped in the first and second electrically conductive layers. Afterward, the base layer is removed in the regions not covered with the etching resist, by means of an etchant, for example an alkaline solution, and the etching resist is then likewise removed. Furthermore, it is also possible to structure the base layer by printing an etchant onto the whole-area base layer or printing a washing mask prior to applying the whole-area base layer or to print a dielectric barrier layer onto an electrically conductive base layer in the regions in which no electrically conductive region are intended to be shaped in the first and second conductive layers, said dielectric barrier layer preventing the plated reinforcement layer from being attached by plating in said regions.

In this case, the conductive printing materials, the etching resist layer, the etchant and the dielectric barrier layer are preferably applied by means of two printing units synchronized with one another, wherein one printing unit prints the first surface of the carrier layer and the second printing unit prints the opposite second surface of the carrier layer. In this case, the printing units are preferably arranged in a manner lying opposite one another on different sides of the carrier layer and are coupled to one another via mechanical or electrical means. In this case, the printing methods used are preferably intaglio printing, offset printing, screen printing, pad printing or inkjet printing.

As a result of this procedure, firstly a cost-effective registered structuring of the first and second electrically conductive layers is obtained. Furthermore, it is thereby possible to produce the plated reinforcement layers of the first and second electrically conductive layers simultaneously in a common plating process, as a result of which firstly the production costs and the production time can be reduced, and secondly plated-through holes for connecting the conductive layers through the carrier layer can be concomitantly produced without additional outlay and the process steps necessary therefor can thus be obviated.

In accordance with one preferred exemplary embodiment of the invention, the first conductor track has a third conductor track section, which preferably adjoins the first conductor track section. In this case, the conductor track width of the third conductor track section is less than the conductor track width of the first conductor track section, preferably at least 100 µm less than the conductor track width of the first conductor track section. It has surprisingly been found that, in the case of such a configuration of the first conductor track, further savings of electrically conductive material are possible, without the quality factor of the antenna structure being appreciably reduced. The ratio of quality factor to used amount of electrically conductive material is thus improved further by this measure.

Furthermore, it has been found that said ratio can be optimized further by virtue of the conductor track width of the third conductor track section being between 10% and 50% of the conductor track width of the first conductor track section, and/or the third conductor track section comprising at least one turn of the first coil-shaped conductor track, with further preference comprising between 1 and 3 turns of the first coil-shaped conductor track. With further preference, the third conductor track section comprises at least 1 turns of the first coil-shaped conductor track and/or the first conductor track section comprises at most three turns of the first coil-shaped conductor track, preferably between 1 and 2 turns of the first coil-shaped conductor track.

Furthermore, it is advantageous if the third conductor track section, with respect to the coil-shaped embodiment of the first conductor track as inner conductor track section, is adjacent to the first conductor track section. This means that the first conductor track section comprises the outer turns of the first conductor track and the third conductor track section comprises the inner turns of the first conductor track. Preferably, in this case, the first conductor track section comprises the outer three-quarter turn of the first coil-shaped conductor track. Investigations have shown that as a result of such an arrangement of first and third conductor track sections compared with an, opposite arrangement (third conductor track section forms outer conductor track section, and first conductor track section forms inner conductor track section) has advantages with regard to the ratio of quality factor to used amount of electrically conductive material.

The first conductor track section preferably has a conductor track width of 0.5 to 5 mm, with further preference of 1 to 2 mm.

Preferably, the film element according to the invention has a substantially rectangular shaping and the first direction corresponds to the longitudinal direction of the carrier layer, i.e. the direction of the longer dimension of the carrier layer. The layer thickness of the first and second electrically conductive layers is preferably between 1 and 18 µm, with further preference between 4 and 12 µm. In this case, the layer thickness of the first and/or second electrically conductive layer can be constant or non-constant. In particular, it is advantageous if the layer thickness of the first electrically conductive layer is greater than the layer thickness of the second electrically conductive layer.

In accordance with one preferred exemplary embodiment of the invention, a first and a second electrode area are formed in the first and/or in the second electrically conductive layer, said electrode areas in each case being electrically connected to the first and/or second conductor track. Preferably, in this case, the first and second conductor tracks are connected to one another via at least one electrically conductive plated-through hole through the carrier layer and/or are capacitively or inductively coupled to one another.

Further advantages are achieved by virtue of the fact that a first and a second electrode area are formed both in the first and in the second electrically conductive layer, wherein the first electrode areas at least partly overlap and are connected to one another via an electrically conductive plated-through hole, and the second electrode areas at least partly overlap and are connected to one another via an electrically conductive plated-through hole. Such a configuration of the first and second electrically conductive layers significantly increases the possibilities for using the film element by virtue of the resultant synergistic effects with only little extra material outlay.

Preferably, the first and/or second conductor track in each case have/has between one and four turns, preferably between one and two turns.

Furthermore, the first electrode area is preferably connected to the first conductor track and the second electrode area to the second conductor track.

Furthermore, it is possible for a third conductor track to be shaped in the first and/or the second electrically conductive layer, said third conductor track being connected to the first or second electrode area and being capacitively and/or inductively coupled to the first and/or second conductor track. Said third conductor track preferably extends over at least 40% of the width of the film element. In this case, the third conductor track is preferably arranged adjacent to a partial region of the first conductor track section.

The first or second electrode areas are preferably shaped and arranged in such a way that an electrical circuit arranged on the multilayer film element or integrated into the multilayer film element can be electrically connected to the first and second electrode areas. The electrode areas therefore preferably have a size of in each at least 2 $mm^2$ and are arranged in a corner of the film element. This makes it possible to carry out, in the central region of the film element, embossing or further mechanical or thermal processing processes that greatly stress the film body.

The layer thickness of the carrier layer is preferably between 250 and 12 µm, with further preference between and 50 µm. In this case, the carrier layer preferably consists of a plastic film. Furthermore, it is also possible for the carrier layer to be embodied in multilayer fashion and to consist, for example, of a plastic film and one or more decorative layers.

In accordance with one preferred exemplary embodiment of the invention, a decorative layer are arranged between the first and second conductor tracks and/or on that side of the first and/or second conductor track which is remote from the carrier layer. Said decorative layer, preferably in conjunction with the first and/or second electrically conductive layer, provides an optically variable security element. The decorative layer thus preferably has a layer that generates an optically variable effect, for example a layer having a microscopic or macroscopic surface relief, in particular a surface relief having a diffractive optical effect, or a surface relief in the form of lens structures, matt structures, asymmetrical structures or blazed gratings, a thin-film layer that generates viewing-angle-dependent color shift effects on account of interference effects, a liquid crystal layer, preferably a cholesteric liquid crystal layer, or a layer comprising optically active pigments, in particular effect pigments, UV- or IR-activatable pigments. The first and/or second electrically conductive layer preferably furthermore also provide(s) a function in the generation of an optically recognizable security feature, for example as a reflection layer which intensifies or concomitantly generates the optically variable effect generated by the decorative layer. It is thus advantageous to arrange the decorative layer in the film element in such a way that it at least partly overlaps the first and/or second conductor track and the optical effects generated by the decorative layer and by the first and/or second electrically conductive layer in the region of the first and/or second conductor track therefore interact and are superposed.

BRIEF DESCRIPTION OF THE DRAWINGS

The invention is explained by way of example below on the basis of a plurality of exemplary embodiments with the aid of the accompanying drawing.

DETAILED DESCRIPTION OF THE INVENTION

Figure 3:
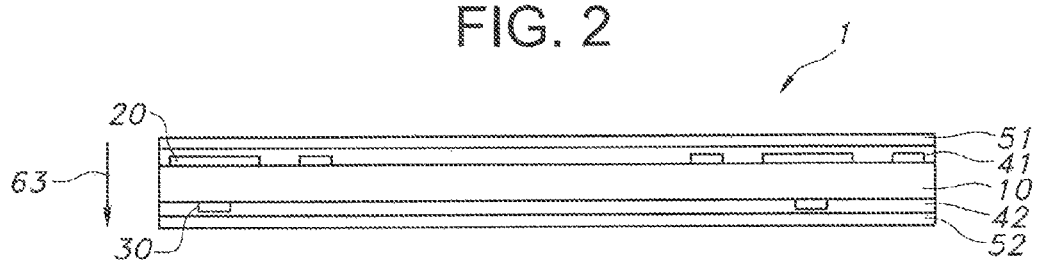
FIG. 3 shows a schematic sectional illustration, not true to scale, of a film element according to the invention for a first exemplary embodiment of the invention.

FIG. 3 shows a multilayer film element 1 comprising a carrier layer 10, an electrically conductive layer 20, a decorative layer 41, a protective layer 51, an electrically conductive layer 30, a decorative layer 42 and a protective layer 52.

The carrier layer 10 is formed by a plastic film, preferably a PET, PET G, PVC, ABS, polycarbonate or BOPP film, synthetic paper or a laminate composite of two or more such layers having a thickness of between 12 and 250 µm, preferably between 50 and 75 µm. In this case, the carrier layer 10 preferably consists of a transparent plastic film. It is furthermore of importance here that the thickness of the carrier layer and thus the distance between the electrically conductive layers 20 and 30 is not greater than 800 µm, in order to achieve a sufficient capacitive coupling of the electrically conductive layers 20 and 30, as explained further below.

The protective layers 51 and 52 are protective lacquer layers having a thickness of 1 to 5 µm. However, it is also possible for the protective layers 51 and 52 to be a plastic film, synthetic paper or a laminate composite of both, having a thickness of between 12 and 100 µm, preferably of 50 µm.

In the simplest case, at least in a partial region, the decorative layers 41 and 42 are color lacquer layers shaped in a patterned fashion. However, it is also possible for the decorative layers 41 and 42 to exhibit one or more optically variable effects which serve as a security feature. Thus, it is possible, for example, for the decorative layers 41 and 42 to consist of a binder with optically active pigments, in particular effect pigments such as thin-film layer pigments or liquid crystal pigments, or UV- or IR-activatable, luminescent pigments. In this case, too, the decorative layers 41 and 42 are preferably configured in patterned fashion and in this case preferably also exhibit different presentations.

Furthermore, it is also possible for the decorative layers 41 and 42 each to consist of different layers which interact and thus generate an optically variable effect. It is thus possible, for example, for the decorative layers 41 and 42 to have a thin-film layer system having one or more spacer layers which have an optically active thickness of $\lambda/4$ and $\lambda/2$, with $\lambda$ lying in the wavelength range of light visible to the human observer, and which therefore generate a color change effect perceptible to the observer. Such a thin-film layer system is constructed, for example, from a preferably thin metallic absorption layer, a preferably dielectric spacer layer and from a reflection layer, wherein the reflection layer in this case is preferably formed by the electrically conductive layer 20 and/or 30. In this case, the electrically conductive layers 20 and 30 form an integral part of the optical layer system generating the color change, such that the electrically conductive layers 20 and 30 produce a double function, as a result of which the security against counterfeiting is considerably increased.

In the same way, the electrically conductive layers 20 and 30 can also interact with differently configured layers of the decorative layers 41 and 42 for the generation of an optically variable effect and thus further increase the security against counterfeiting. It is thus possible, for example, for the decorative layers 41 and 42 to have a replication lacquer layer, onto which an optically active surface relief is impressed by means of UV replication or by means of a heated embossing die (thermal replication), and for the electrically conductive layers 20 and 30 to interact as reflection layers with said surface relief, such that a corresponding optically variable effect is generated in the region in which the electrically conductive layers 20 and 30 are provided. Preferably, the optically active surface relief is a diffractive surface relief, for example a hologram, a microlens structure (microlenses having a diameter of less than 300 μm, in particular of less than 50 μm), a matt structure or a blazed grating. Furthermore, it is also possible for the decorative layers 41 and 42 to have a volume hologram layer, in which a volume hologram is written, or for the decorative layers 41 and 42 to have an oriented and crosslinked liquid crystal layer, which, by way of example, is oriented differently in different regions, as a result of which the incident light is polarized differently in different regions. Furthermore, it is also possible to use a cholesteric liquid crystal material which, on account of its helical structure, likewise exhibits a viewing-angle-dependent color shift effect.

The electrically conductive layers 20 and 30 are preferably layers consisting of or containing a metallic, electrically conductive material, for example aluminum, copper, silver, chromium, gold or a metal alloy. Furthermore, it is also possible for the electrically conductive layers 20 and 30 to consist of or contain some other electrically conductive material, for example an electrically conductive polymer or a transparent, electrically conductive material, for example ITO.

The production of the electrically conductive layers 20 and 30 and the configuration thereof will be explained below with reference to FIG. 1, FIG. 2, FIG. 5, FIG. 6 and FIG. 7.

Figure 1:
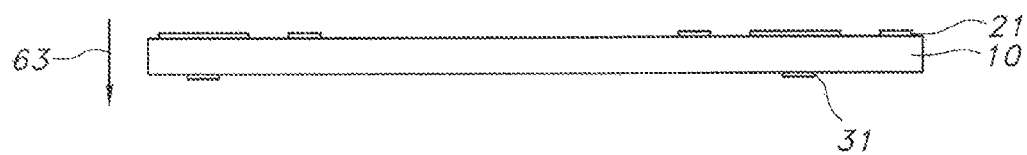
FIG. 1 and FIG. 2 show schematic sectional illustrations, not true to scale, of film bodies for elucidating the method according to the invention for producing a multilayer film element.

In order to produce the electrically conductive layers, in a first step, an electrically conductive base layer is applied to the carrier layer 10. Thus, FIG. 1 shows the carrier layer 10, on one surface of which a base layer 21 is applied and on the opposite other surface of which the base layer 31 is applied.

In this case, the base layers 21 and 31 preferably consist of an electrically conductive printing material, for example composed of an electrically conductive ink containing metal particles, in particular silver particles. In this case, the base layers 21 and 31 are printed onto the carrier layer 10 by means of a printing method, preferably printed by means of an intaglio printing method with an application thickness of between 0.5 and 5 μm, and are then dried. Preferably, the base layers 21 and 31 are in this case printed by means of two synchronized printing units, wherein one printing unit is arranged on one side of the carrier layer 10 and the second printing unit is arranged in a manner lying opposite the first printing unit on the other side of the carrier layer 10. The synchronization of the two printing units is effected by a mechanical coupling of the printing units or by a corresponding electrical coupling, i.e. exchange of corresponding synchronization data. As a result of this procedure, firstly a high register accuracy is obtained when printing the base layers 21 and 31, and secondly a high production speed is obtained. The thickness of the base layers 21 and 31 after drying is preferably 0.3-3 μm.

In a second step, the film body comprising the carrier layer 10 and the base layers 21 and 31 is fed to a plating station, in which, in the region in which the electrically conductive base layers 21 and 31 are provided, a plated reinforcement layer is deposited by means of an electroplating process. For this purpose, electrodes make contact with the electrically conductive base layers 21 and 31 and a voltage potential is applied thereto such that, from the electrolyte of the plating bath, a plated reinforcement layer 22 and 32 is deposited on the base layers 21 and 31, respectively. In this case, the deposition of the plated reinforcement layers 32 and 22 is preferably effected in parallel in one and the same plating bath, as a result of which further advantages are achieved, as already explained above.

Preferably, the plated reinforcement layers 22 and 32 in this case consist of a metallic material, which differs from the electrically conductive material of the base layers 21 and 31. The layer thickness of the plated reinforcement layers 22 and 32 is preferably between 0.7 and 15, such that the total thickness of the electrically conductive layers 20 and 30 is between 1 and 18.

After a cleaning process and drying, the decorative layers 41 and 42 and the protective lacquer layers 51 and 52 are then applied and the film elements are then integrated with another part of the document or for the time being singulated by means of a cutting or stamping process.

However, it is also possible to dispense with applying one or more of the layers 41, 42, 51 and 52.

In this case, the shaping of the electrically conductive layers 20 and 30 is controlled by the printing process described with reference to FIG. 1. In this case, FIG. 5 clarifies the resultant shaping of the electrically conductive layer 20, and FIG. 6 clarifies the resultant shaping of the electrically conductive layer 30.

Figure 5:
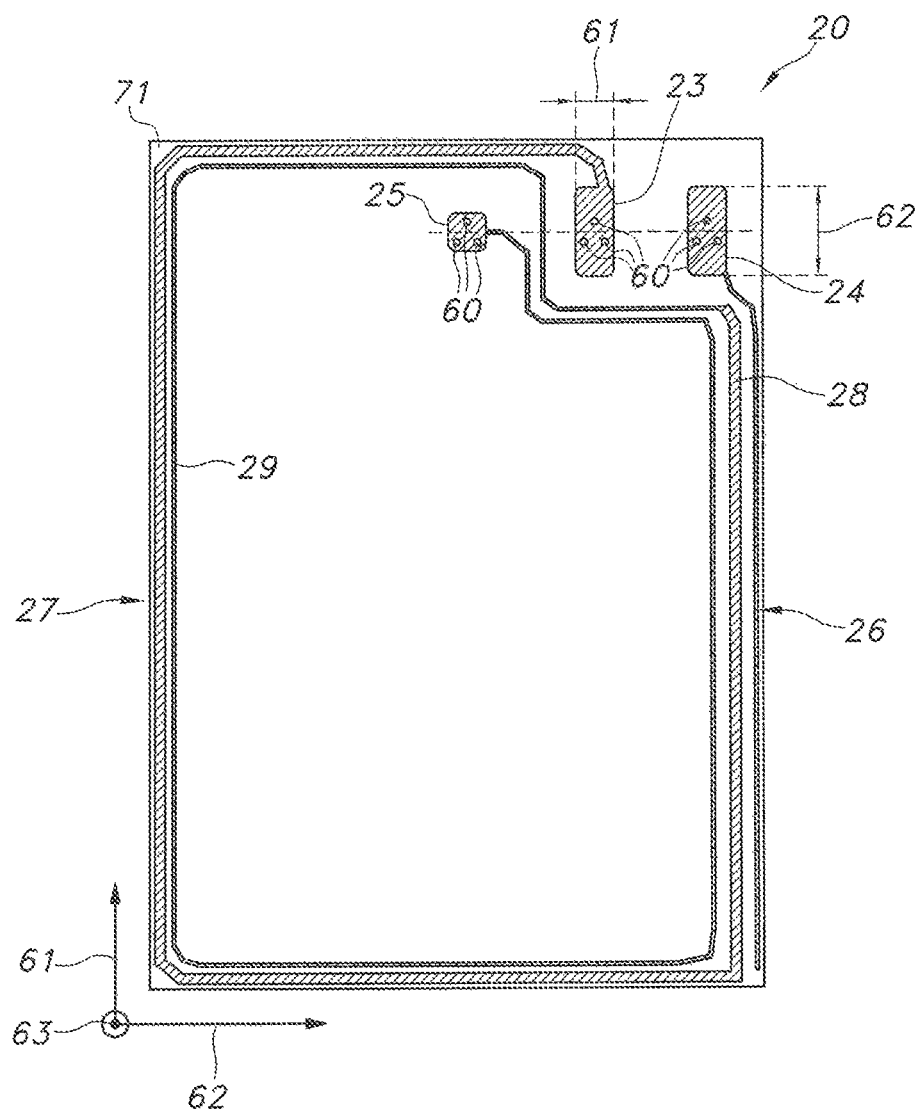
FIG. 5 shows an illustration for clarifying the structuring of a first electrically conductive layer of the film element according to FIG. 3.

As shown in FIG. 5, two electrode areas 23 and 24, a through-plating area 25, a coil-shaped conductor track 27 and a conductor track 26 are shaped in a region 71 of the film element 1. The coil-shaped conductor track 27 connects the electrode area 23 to the through-plating area 25. The electrode area 24 is connected to the conductor track 26. Furthermore, FIG. 5 indicates plated-through holes 60, in which the carrier layer 10 is perforated by a cutout and which are filled with the plated material of the reinforcement layer in the plating process during the plating of the plated reinforcement layers 22 and 32 and thus provide an electrically conductive through-plating through the carrier layer 10.

As shown in FIG. 5, the coil-shaped conductor track 27 has two conductor track sections 28 and 29, in which the conductor track 27 has a different conductor track thickness. The outer conductor track section 28 is adjacent to the electrode area 23, on the one hand, and to the inner conductor track section 29, on the other hand. The inner conductor track section 29 is adjacent to the outer conductor track section 28, on the one hand, and to the through-plating area 25, on the other hand. The conductor track width of the outer conductor track section is preferably 0.5 to 5 mm, with further preference 1 to 2 mm, and the conductor track width of the inner conductor track section 29 is significantly less than that of the outer conductor track section 28, preferably 200 and 400 μm less than that of the outer conductor track section 28. The conductor track width of the inner conductor track section 29 is thus 0.5 mm, for example. The conductor track width of the conductor track 26 is approximately in the range of the conductor track width of the inner conductor track section, that is to say is preferably likewise at least between 200 and 400 µm less than the conductor track width of the outer conductor track section 28 and is likewise approximately 0.5 mm in the exemplary embodiment according to FIG. 5.

It is also possible to dispense with the conductor track 26, as explained further below.

In the exemplary embodiment according to FIG. 5, the length dimension of the outer conductor track section is approximately 78 mm and the width dimension of the outer conductor track section is approximately 48 mm.

Figure 6:
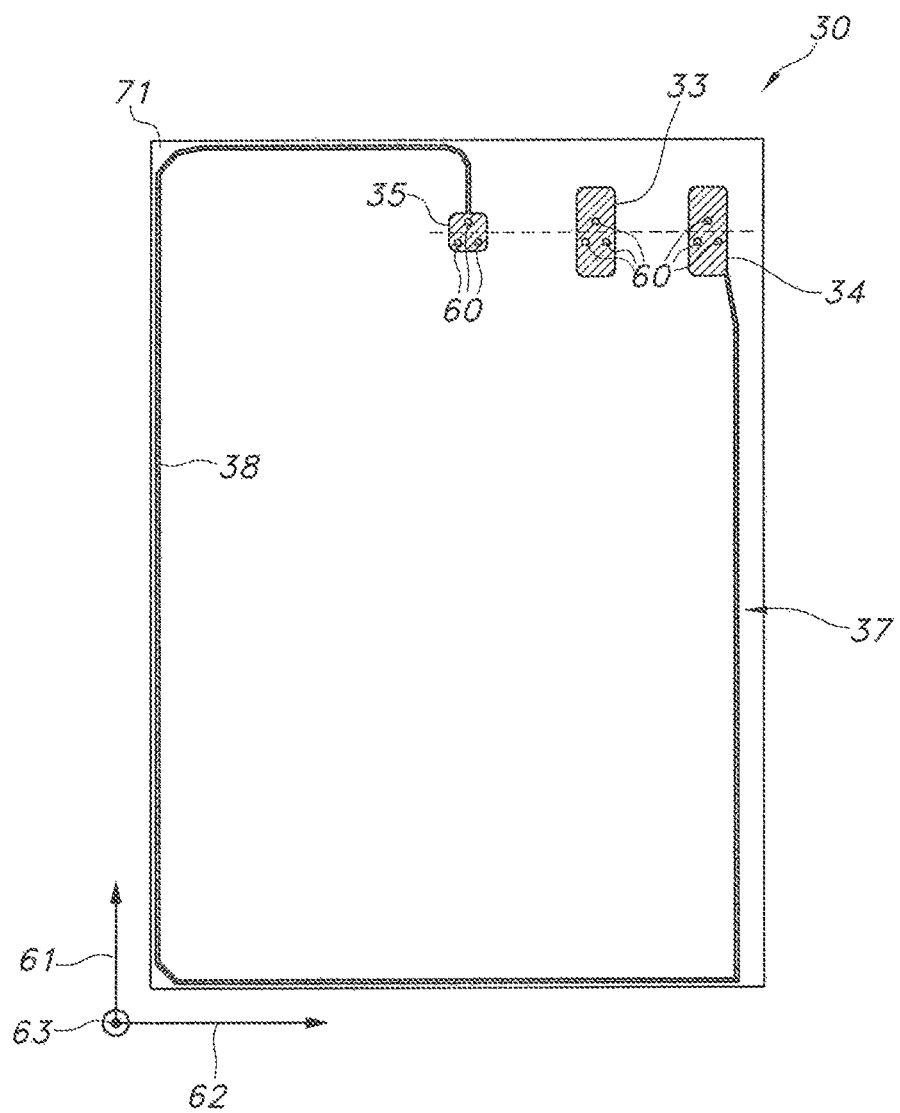
FIG. 6 shows an illustration for clarifying the structuring of a second electrically conductive layer of the film element according to FIG. 3.

FIG. 6 then shows the shaping of the electrically conductive layer 30. As shown in FIG. 6, two electrode areas 33 and 34, a through-plating area 35 and a coil-shaped conductor track 37 are shaped in the region 71 in the electrically conductive layer 30. The coil-shaped conductor track 37 is connected to the electrode area 34, on the one hand, and the through-plating area 60, on the other hand. As indicated in FIG. 6, the conductor track width of the conductor track 37 approximately corresponds to the width of the conductor track section 29 of the electrically conductive layer 20 and is accordingly less than the conductor track width of the conductor track section 28 of the conductor track 27.

Figure 7:
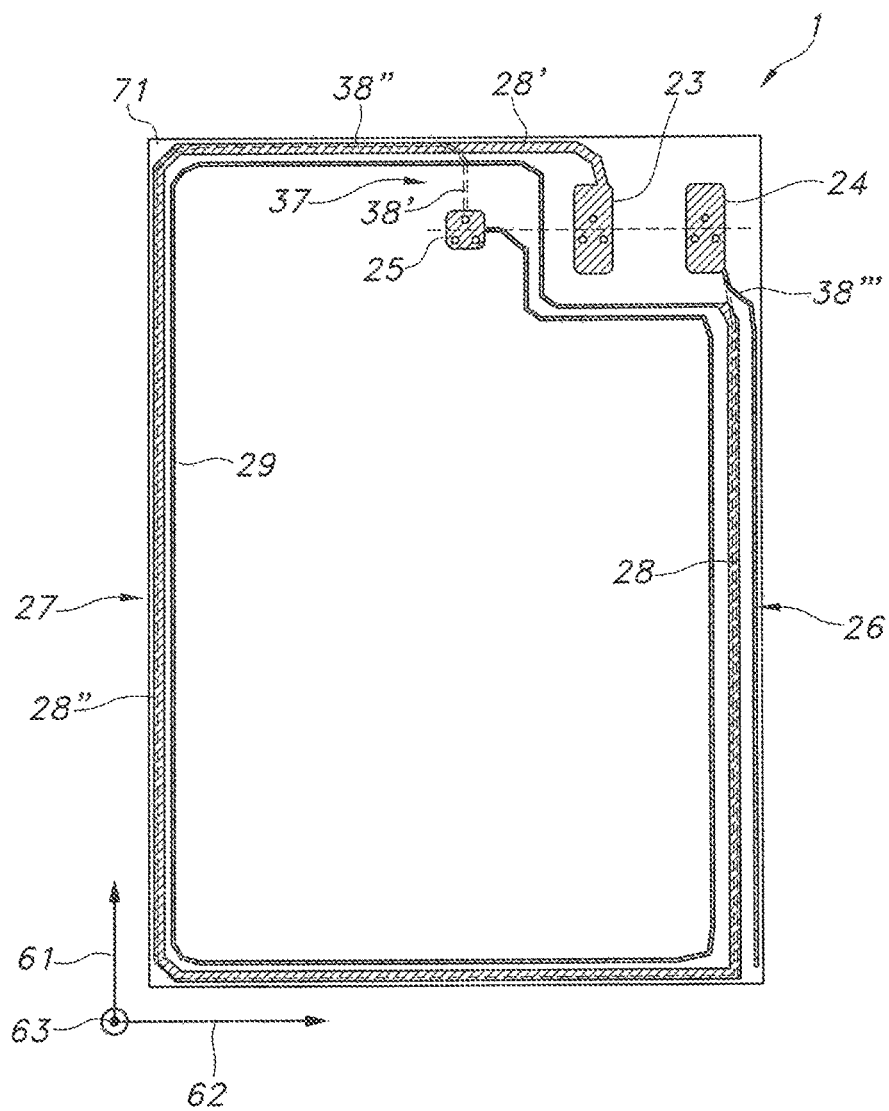
FIG. 7 shows an illustration for clarifying the mutual overlap of the first and second electrically conductive layers of the film element according to FIG. 3.

FIG. 7 then shows an illustration that clarifies the overlapping of the electrically conductive layer 30 by the electrically conductive layer 20 with respect to a direction 63 perpendicular to the plane spanned by the carrier layer, to be precise with respect to a viewing direction from the side of the electrically conductive layer 20.

As indicated in FIG. 1 to FIG. 3 and FIG. 5 to FIG. 7, the electrically conductive layers 20 and 30 and also the carrier layer 10 lie in planes which are arranged parallel to one another and which are spaced apart from one another in a direction 63 perpendicular to the plane spanned by the carrier layer 10. The electrically conductive layers 20 and 30 extend in two mutually perpendicular directions 61 and 62 lying in the planes which are spanned by the electrically conductive layers 20 and 30 and also by the carrier layer 10 and are arranged parallel to one another. In this case, the electrically conductive layers 20 and 30 are oriented with respect to one another such that from viewing in the direction of the direction 63 perpendicular to the plane spanned by the carrier layer 10, that is to say upon the projection—oriented in the direction 63—of the conductive layers 20 and 30 onto one another, the overlapping of the electrically conductive layers 20 and 30 in the region 71 as shown in FIG. 7 arises:

The electrode areas 23 and 24 and also the through-plating area 25 overlap the electrode areas 33, 34 and the through-plating area 35 respectively. Furthermore, the electrode areas 23 and 33, the electrode areas 24 and 34 and also the through-plating areas 25 and 35 are in each case electrically conductively connected to one another via the plated-through holes 60.

As indicated above, however, the conductor track 26 can be dispensed with. In this case, the coil-shaped conductor track 27 preferably connects the electrode area 24 to the through-plating area 25, and the outer conductor track section 28 adjoins the electrode area 24, on the one hand, and the inner conductor track section 29, on the other hand. Furthermore, the coil-shaped conductor track 37 is then connected to the electrode area 33, on the one hand, and to the through-plating area 60, on the other hand.

A partial section of the outer, wider conductor track section 28 of the electrically conductive layer 20, the conductor track section 28", overlaps a partial section of the conductor track section 38 of the electrically conductive layer 30, the conductor track section 38". The conductor track section 28 therefore comprises a conductor track section 28', in which the conductor track 27 has a larger conductor track width and which does not overlap the conductor track 37, the conductor track section 28", in which the conductor track 27 has a larger width and in which the conductor track 27 completely overlaps the conductor track 28, and a conductor track section 29, in which the conductor track 27 has a smaller conductor track thickness and in which the conductor track 27 does not overlap the conductor track 37. Complete overlapping of a second conductor track section by a first conductor track section should be understood to mean that no regions of the second conductor track section are present in which the second conductor track section is not overlapped by the first conductor track section, i.e. upon a projection—oriented in the direction 63—of the second conductor track section onto the first conductor track section, the area of the second conductor track section lies within the area of the first conductor track section. The conductor track 38 therefore comprises a conductor track section 38', in which the conductor track 37 is not overlapped by the conductor track 27, a conductor track section 38", in which the conductor track 37 is overlapped by the conductor track 27, and a conductor track section 38''', in which the conductor track 37 is not overlapped by the conductor track 27. Along the conductor track section 38", the conductor track 37, namely the conductor track section 38", is overlapped completely by the conductor track 27, namely the conductor track section 28", with respect to the direction 63 perpendicular to the plane spanned by the carrier layer. The electrically conductive layers 20 and 30 are accordingly structured and oriented with respect to one another in such a way that such complete overlapping of the conductor track 37 by the conductor track 27 is effected in the region of the conductor track sections 28" and 38". Furthermore, the conductor track 27 is shaped in the conductor track section 38" with respect to the conductor track 27 overlapped here in such a way that, in at least one direction lying in the plane spanned by the carrier layer, for example the direction 62, the extent of the conductor track 37 is at least 100 µm, preferably between 200 and 400 µm, less than the extent of the conductor track 27.

In this case, extent of a conductor track in a direction is understood to mean the distance between the points of intersection at which the straight line defined by the direction intersects the two outer contours, that is to say the inner and the outer, respectively, outer contour, of the conductor track. If the direction is oriented perpendicularly to the longitudinal direction of the conductor track, then this extent corresponds to the conductor track width. Thus, by way of example, in that region of the conductor track 27 in which the longitudinal direction of the conductor track 27 is oriented in the direction of the direction 62, the extent of the conductor track 27 in the direction 61 corresponds to the width of the conductor track. Conversely, in that region of the conductor track 27 in which the longitudinal direction of the conductor track 27 is oriented in the direction of the direction 61, the extent of the conductor track 27 in the direction of the direction 62 corresponds to the width of the conductor track 27 in said region.

Preferably, in this case, not only in one direction, that is to say in the direction of the direction 61 or 62, but rather in both directions 61 and 62, the extent of the conductor track 38 along the conductor track section 38 is less than the extent of the conductor track 27 in said direction or directions. This means that the width of the conductor track 37 along the conductor track section 38" is therefore less than the width of the conductor track 27 along the conductor track section 27". Preferably, in this case, the difference in the extent of the conductor tracks 27 and 37 in one direction differs from the difference in the extent of the first and second conductor tracks in the second direction. In this way, it is possible to take account of different register tolerances in one direction and/or in the other direction when applying or structuring the electrically conductive layers 20 and 30. In a first direction, for example in the direction 62, in which the register tolerances (of these processes) are larger, a larger difference in the extent in the first and second conductor tracks is also provided, whereas in the other direction, for example the direction 61, in which the register tolerances are smaller, a smaller difference in the extent of the first and second conductor tracks is provided. Thus, at least a difference in the extents of 100 μm is provided in one direction and a difference in the extents of at least 50 μm is provided in the other direction and, preferably, the difference in the extent in the first direction is provided as more than 50 μm greater than the difference in the extents in the second direction. If, for example, the direction 62 forms the direction in which the carrier layer runs upon the traversal of the printing units used for applying the base layers 21 and 31, then the difference in the extents in the direction 62 is defined as greater than the difference in the extents in the direction 61. Therefore, the conductor track width of the conductor track 27 is chosen to be greater in the regions of the conductor track section 28 in which the longitudinal direction of the conductor track 27 is oriented in the direction 61 than in the regions of the conductor track section 28 in which the longitudinal direction of the conductor track 27 are oriented in the direction 62. In this case, the difference in the conductor track width is preferably between 50 and 200 μm.

The conductor track sections 27" and 38", in which the conductor track 37 is completely overlapped by the conductor track 27, comprises at least a three-quarter turn of the conductor track 27 and 28, respectively. Preferably, the conductor track sections 38" and 28" comprise between 1 and 3 turns of the conductor track 37 and 27, respectively. As a result of the complete overlapping of the conductor track 37 by the conductor track 27 along the conductor track section 28" and 38", respectively, and the wider shaping of the conductor track 27 in this region, a register-tolerant capacitive coupling of the two conductor track sections 28" and 38" is obtained and the conductivity of the conductor track 27 is increased in this region, as a result of which the advantages mentioned above are achieved. Furthermore, the provision of the conductor track 26 results in a capacitive coupling of the conductor track 26 to the adjacent section of the conductor track 27.

Figure 2:
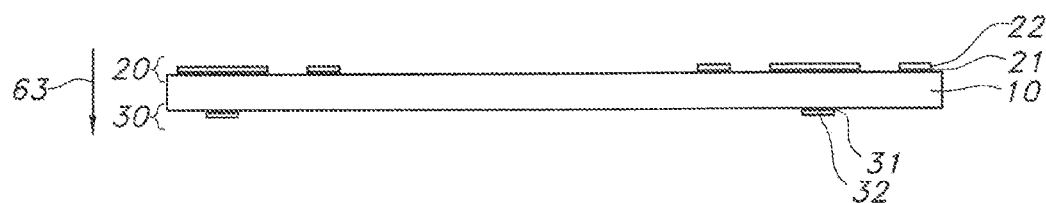

In a further step, an electrical circuit, preferably an integrated circuit in the form of a silicon chip or a circuit produced with organic electronics, is applied to the film body illustrated in FIG. 2 in the region of the electrode areas 23 and 24 and is contact-connected to the electrode areas 23 and 24, for example by means of an electrically conductive adhesive. The particular configuration of the electrically conductive layers 20 and 30 in this case makes it possible to apply the electrical circuits to the top side or underside of the film body, depending on the requirements, or to provide two electrical circuits, wherein one electrical circuit is arranged on the top side and the second electrical circuit is arranged on the underside of the film body.

The effect of a register-tolerant capacitive coupling of the two conductor track sections 28" and 38" as described above on the basis of the embodiment according to FIG. 5 to FIG. 7 with respect to the conductor track sections 28" and 38" will be explained in detail below with reference to FIG. 8a to FIG. 9b.

Figure 8A:
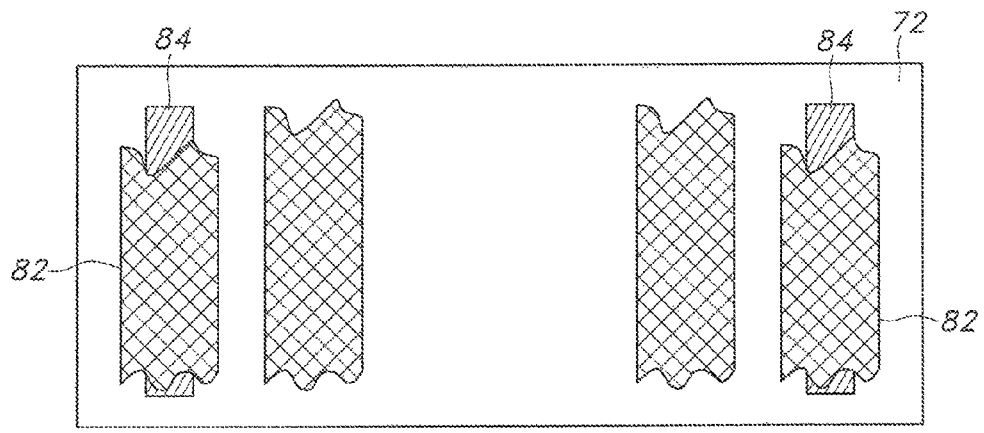
FIG. 8a and FIG. 8b show illustrations for clarifying the mutual overlap of the first and second electrically conductive layers of the film element according to FIG. 3 for a further exemplary embodiment.

FIG. 8a shows an excerpt from a region 72 in which a coil-shaped conductor track 81 is impressed in the electrically conductive layer 20 and a coil-shaped conductor track 83 is impressed in the electrically conductive layer 30. The conductor track 81 and the coil-shaped conductor track 83 each have a conductor track section 82 and 84, respectively, which comprises at least a three-quarter turn of the coil-shaped conductor track, and a respective excerpt from which is shown in FIG. 8a to FIG. 9b. As indicated in the illustrations in FIG. 8a and FIG. 8b, the conductor track section 82 in this case completely overlaps the conductor track section 84, at least in a region comprising a quarter turn of the conductor track section 82 and preferably also in the entire region of the conductor track section 82. Thus, FIG. 8a also shows the complete overlapping of the conductor track section 84 by the conductor track section 82 in two opposite partial sections of turns of the conductor tracks 81 and 85.

Figure 8B:
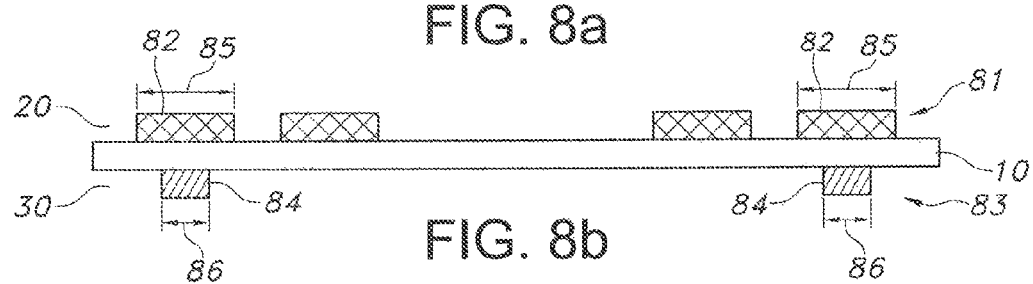
Figure 9A:
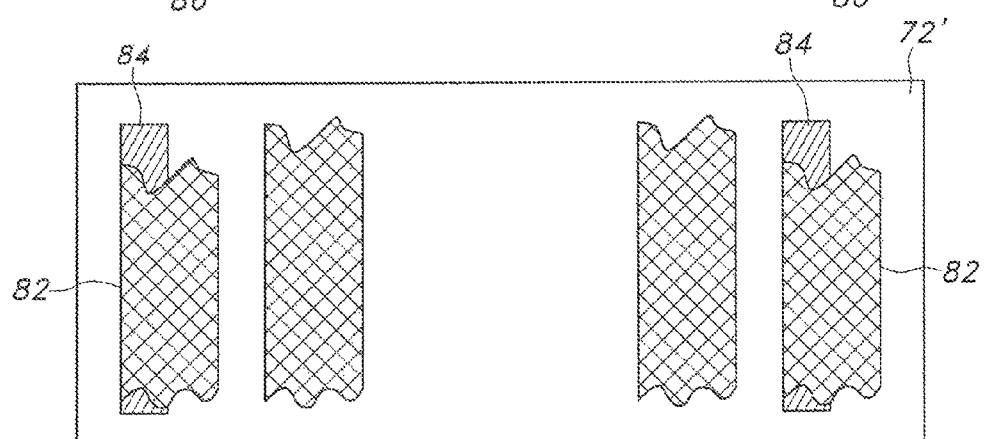
FIGS. 9a and 9b show illustrations for clarifying the mutual overlap of the first and second electrically conductive layers of the film element according to FIG. 3 for a further exemplary embodiment.
Figure 9B:
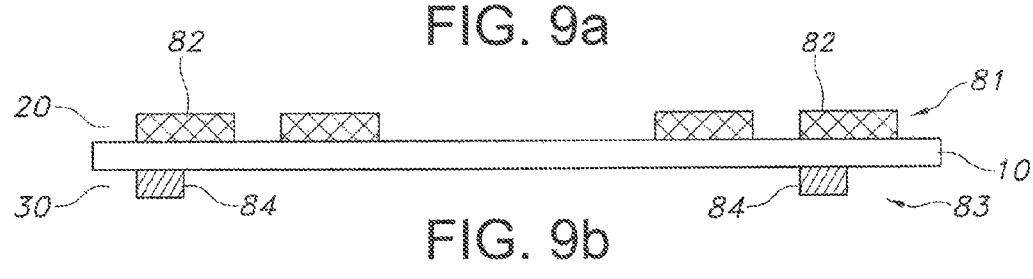

The extent 86 of the conductor track 83 in a direction lying in a plane spanned by the carrier layer 10 and lying in the sectional plane of the cross section according to FIG. 8 is in this case less than the extent 85 of the conductor track 81 in this direction by the value r, as is shown in FIG. 8b. A displacement of the coil-shaped conductor tracks 81 and 83 with respect to one another, such as can occur during the structuring of the electrically conductive layers 20 and 30 on account of register inaccuracies, therefore does not lead to the alteration of the capacitive portion brought about by the capacitive coupling of the conductor track sections 82 and 84, as long as the value r is chosen to be large enough, in particular is chosen to be greater than the register tolerances. This is illustrated by way of example in FIG. 9a and FIG. 9b, which show an excerpt from a region 72', in which the coil-shaped conductor tracks 81 and 83 are displaced relative to the desired predefinition (FIG. 8a, FIG. 8b) on account of the register inaccuracies during the structuring of the electrically conductive layers 20 and 30.

Figure 10A:
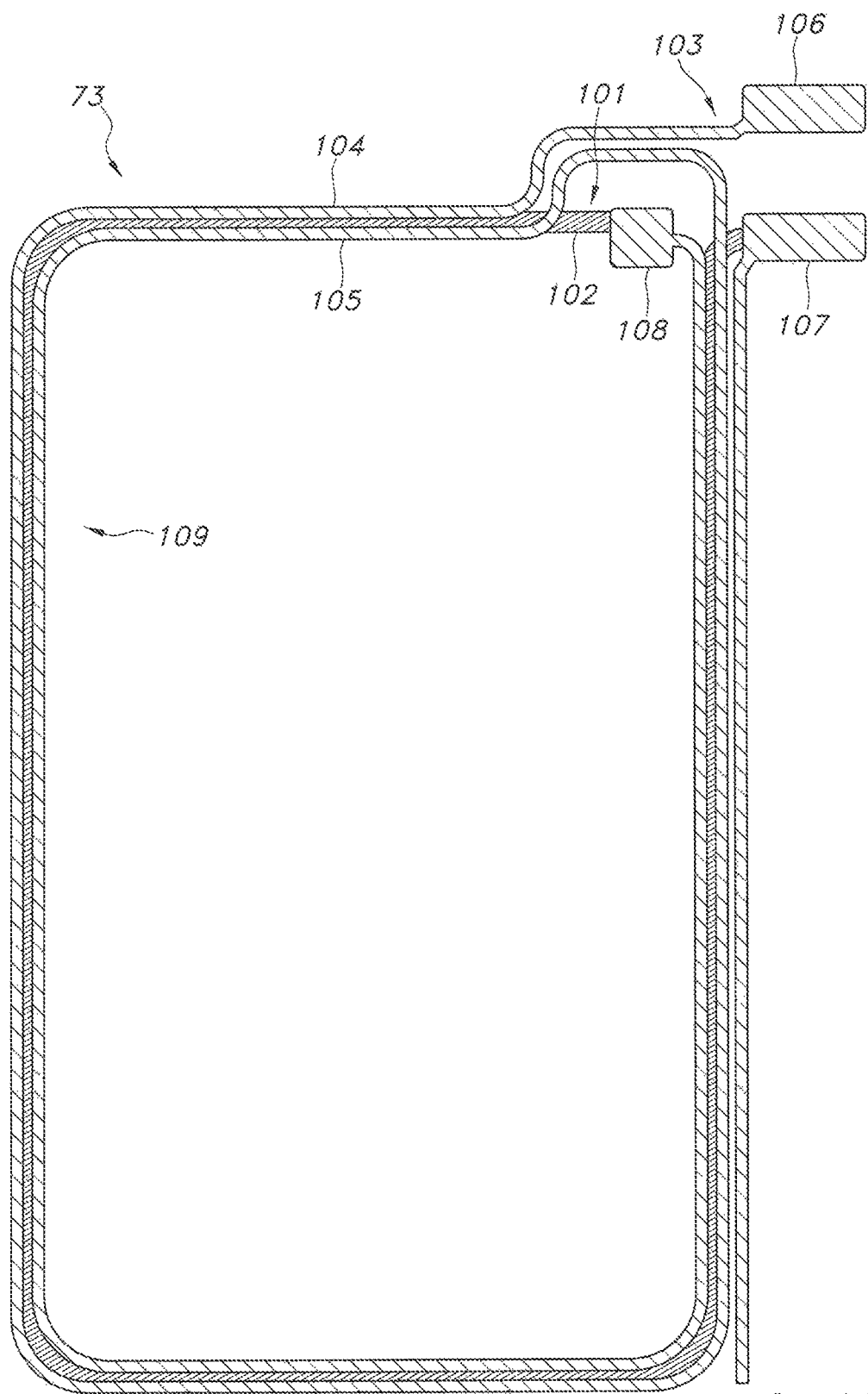
FIG. 10a and FIG. 10b show schematic illustrations of a plan view of the top side and underside, respectively, of a film element according to FIG. 3 in accordance with a further exemplary embodiment.
Figure 10B:
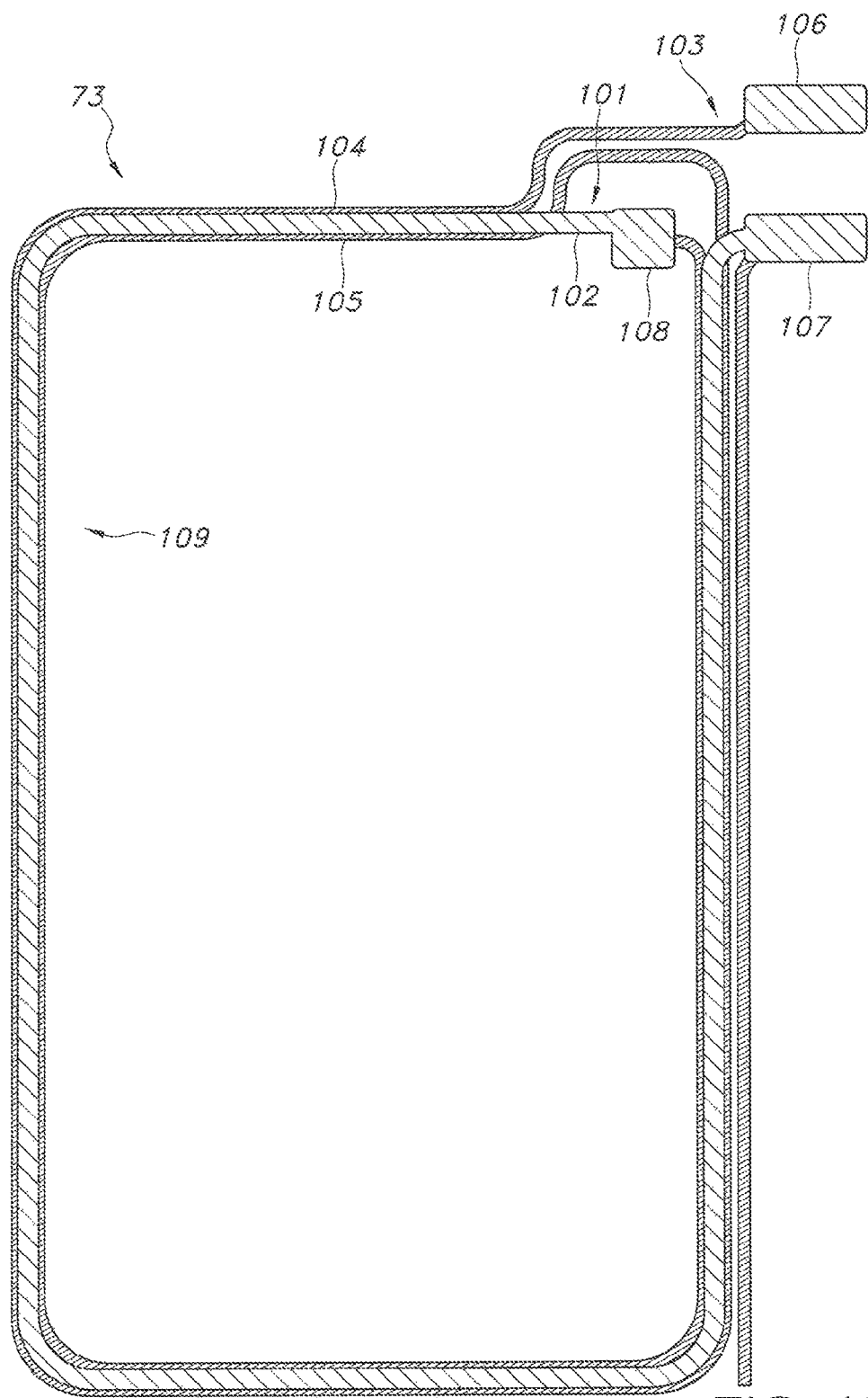

A further embodiment of the film element according to FIG. 3 will now be explained with reference to FIG. 10a to FIG. 12b. FIG. 10a shows a schematic plan view of the top side of a region 73 of a film element. As indicated in FIG. 10a, a coil-shaped conductor track 103 is provided in the electrically conductive layer facing the observer, one end of said conductor track being connected to an electrode area 106 and the other end to a through-plating area 108. In the underlying electrically conductive layer separated by the carrier layer 10, a coil-shaped conductor track 101 is impressed, one end of which is connected to the through-plating area 108 and the other end of which is connected to an electrode area 107. FIG. 10b shows a schematic plan view of the region 73 of the film element from the underside. Here the electrically conductive layer with the coil-shaped conductor track 101 faces the observer and the coil-shaped conductor track 103 is provided below the coil-shaped conductor track 101—in a manner separated by the carrier layer 10. As illustrated in FIGS. 10a and 10b, the coil-shaped conductor track 103 has two turns, and the coil-shaped conductor track 101 has one turn. However, it is also possible for the number of turns of the coil-shaped conductor tracks 101 and 103 to be chosen differently, preferably to be chosen from the range of three-quarter turn to 5 turns. As is furthermore discernible in FIG. 10a and FIG. 10b, the coil-shaped conductor track 101 has a conductor track section 102, which partly overlaps the conductor track 103, and the conductor track 103 has a conductor track section having partial sections 104 and 105, which are partly overlapped by the conductor track section 102. In this case, the two partial sections 104 and 105 are assigned to different turns of the coil-shaped conductor track 103. In accordance with the arrangement according to FIG. 10a and FIG. 10b, therefore, the conductor track section 102 in each case at least partly overlaps the two partial sections 104 and 105 of the conductor track section of the conductor track 103 in a region 109 (demarcated by dash-dotted lines) comprising somewhat more than a three-quarter turn of the conductor track section 102, wherein the two partial sections 104 and 105 are assigned to different turns of the coil-shaped conductor track 103.

Figure 11A:
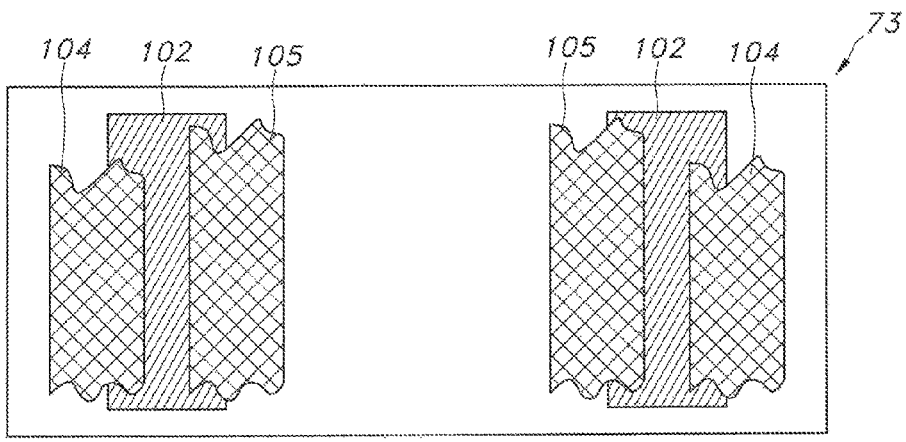
FIG. 11a and FIG. 11b show illustrations for clarifying the mutual overlap of the first and second electrically conductive layers for the exemplary embodiment according to FIG. 10a and FIG. 10b.
Figure 11B:
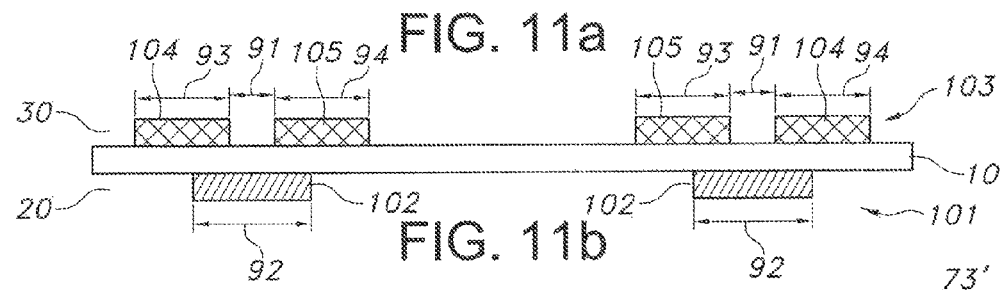

This is also shown schematically in FIG. 11a and FIG. 11b, which show an excerpt from a plan view and a sectional illustration of the region 73.

In this case, two partial sections are assigned to different turns of the second conductor track section if for each line of intersection transversely with respect to the first conductor track section in this region the respective points of intersection of the partial sections with the line of intersection along the second conductor track section are arranged at a distance of at least half a turn from one another.

As shown in FIG. 11b, the conductor track section 102 has a conductor track width 92 and the partial sections 104 and 105 have a conductor track width 93 and 94, respectively. Furthermore, the two partial sections 104 and 105 are spaced apart from one another by a distance 91 from one another. The distance 91 is determined by the spacing between the mutually facing flanks of the partial sections 104 and 105, as is illustrated in FIG. 11b.

In the region 109, the distance 91 between the two partial sections 104 and 105 of the conductor track section 103 is chosen to be less than the width 92 of the first conductor track section by at least the value r. Furthermore, the sum of the widths 93 and 94 of the two partial sections 104 and 105, respectively, of the conductor track section 103 and the distance 91 between the two partial sections 104 and 105 is greater than the width 92 of the first conductor track section 101 by at least the value r.

The widths of the conductor tracks and the spacing between the latter are determined on the basis of the same straight lines of intersection, which is preferably perpendicular to the inner contours of the conductor track sections or partial sections or is oriented parallel to the first direction.

This condition should preferably be met along the entire conductor track section 102. If the conductor track widths 93, 94 and 92 and also the distance 91 thus vary along the region 109, therefore, these values should be chosen locally in such a way that the above condition is met.

Figure 12A:
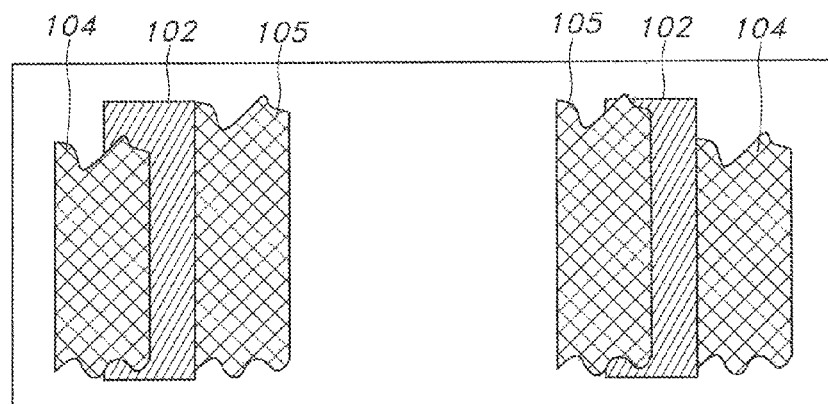
FIG. 12a and FIG. 12b show illustrations for clarifying the mutual overlap of the first and second electrically conductive layers of the film element according to FIG. 3 for a further exemplary embodiment.
Figure 12B:
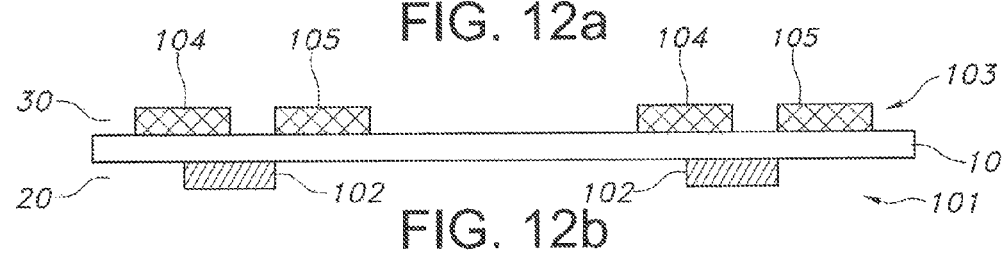

This configuration of the coil-shaped conductor tracks 101 and 103 and this arrangement with respect to one another firstly brings about an—as already explained above—advantageous series capacitive coupling of partial sections of the conductor track 103 via the conductor track section 102 and furthermore has the effect that register inaccuracies during the structuring of the electrically conductive layers 20 and 30 do not or only insignificantly influence the resonant frequency of the antenna. This is illustrated in FIG. 12a and FIG. 12b, which show a relative displacement of the coil-shaped structures 101 and 103 with respect to one another in comparison with the desired state (FIG. 11a, FIG. 11b), said displacement being caused by register inaccuracies. In the case of a relative displacement in the direction of the sectional line of the sectional illustration according to FIG. 11b and FIG. 12b, the capacitance of one capacitive element increases and the capacitance of the other capacitive element decreases, thus resulting in total in substantially no change in the total capacitance.

Figure 13A:
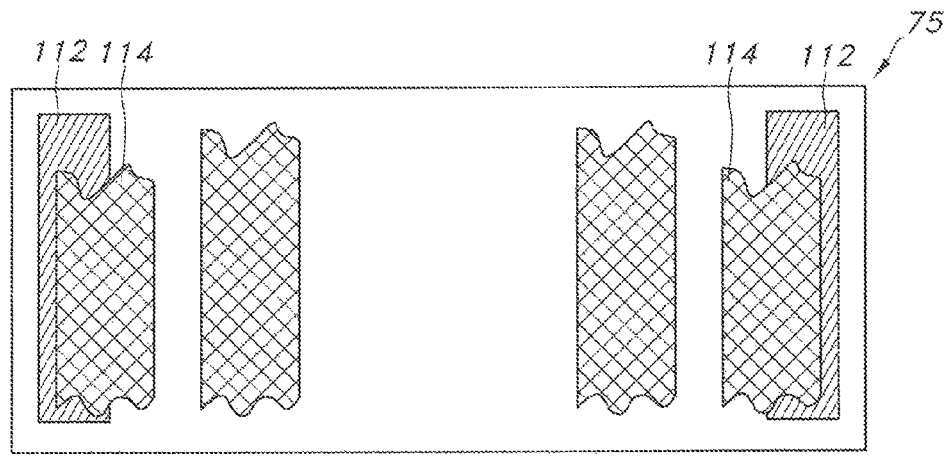
FIG. 13a and FIG. 13b show illustrations for clarifying the mutual overlap of the first and second electrically conductive layers of the film element according to FIG. 3 for a further exemplary embodiment.
Figure 13B:
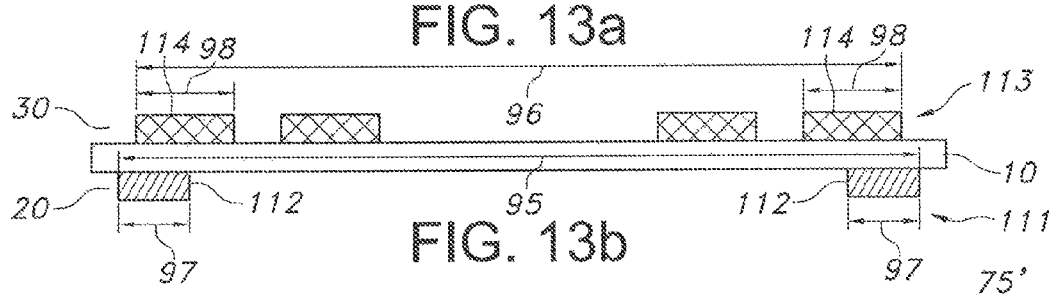

A further exemplary embodiment of the film element according to FIG. 3 will now be explained with reference to FIG. 13a to FIG. 14b. FIG. 13a and FIG. 13b show an excerpt from a region 75 of a film element, in which a coil-shaped conductor track 113 is shaped in the electrically conductive layer 30 and a coil-shaped conductor track 111 is shaped in the electrically conductive layer 20. The coil-shaped conductor track 111 has a conductor track section 112 comprising at least a three-quarter turn of the coil-shaped conductor track 111, and the conductor track 113 has a conductor track section 114 comprising at least a three-quarter turn. Preferably, the conductor track sections 112 and 114 comprise three-quarter to 3 turns of the coil-shaped conductor track 111 and 113, respectively.

The conductor track section 114 has a conductor track width 98 and the conductor track section 111 has a conductor track width 97, as is illustrated in FIG. 13b. Along the conductor track section 111, the conductor track section 111 at least partly overlaps the conductor track section 114 in at least one region comprising t turns of the conductor track section 112—or partly overlaps the conductor track section 114 along the entire conductor track section 112, as is illustrated in FIG. 13a and FIG. 13b. Along the first conductor track section, in these regions, the external diameters of the in each case partly overlapping turns of the coil-shaped conductor tracks 111 and 113 differ. Consequently—as shown in FIG. 13b—the external diameter 95 of the partly overlapped turn of the coil-shaped conductor track 111 and the external diameter 96 of the partly overlapped turn of the coil-shaped conductor track 113 are determined for each point of the region. In this case, the external diameter is determined along a line of intersection which is determined parallel to a direction lying in the plane spanned by the carrier layer or is situated through the common area centroid of the first and second conductor track sections. Furthermore, it can also be provided that, in particular in the case of rectangular or square shaping of the first and second conductor track sections, in a first region comprising a quarter turn (1st and 3rd quadrants) a first direction is used, and in a second region comprising a quarter turn (2nd and 4th quadrants) a second direction, preferably perpendicular thereto, is used, for the orientation of the line of intersection. Preferably, however, a line of intersection is used which is perpendicular to the respectively considered partial sections of the first and/or second conductor track section, i.e. the conductor track section 112 and/or 114, respectively.

As already set out above, the coil-shaped conductor tracks 111 and 113 are in this case configured in such a way that the external diameters 95 and 96 differ by the value r and the conductor tracks 97 and 98 is in each case greater than twice the value r.

Figure 14A:
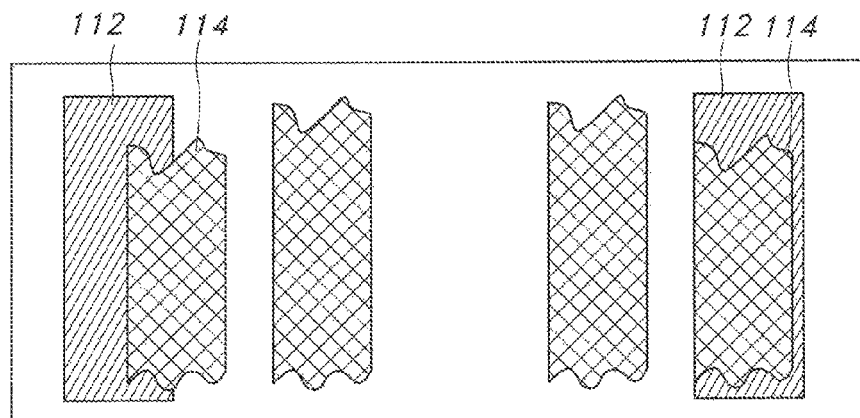
FIG. 14a and FIG. 14b show illustrations for clarifying the mutual overlap of the first and second electrically conductive layers of the film element according to FIG. 3 for a further exemplary embodiment.
Figure 14B:
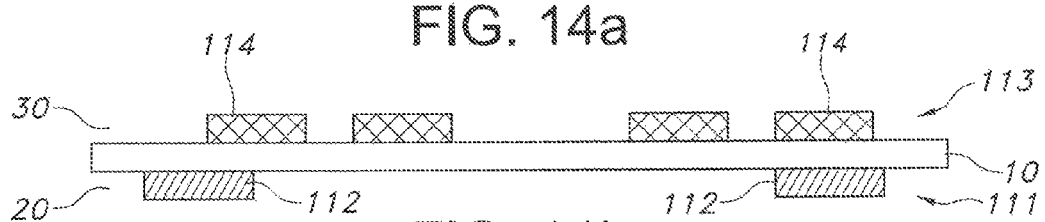
Figure 15A:
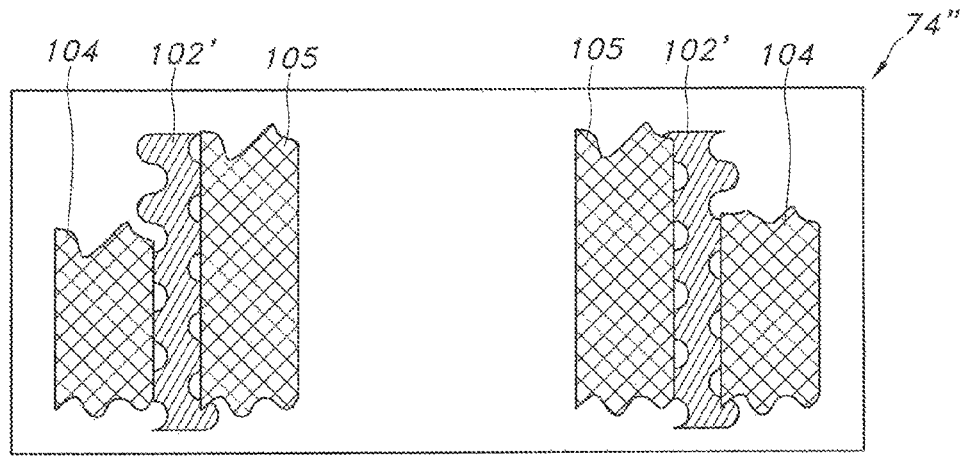
FIG. 15a to FIG. 15d show illustrations for clarifying the mutual overlap of the first and second electrically conductive layers of the film element according to FIG. 3 for a further exemplary embodiment.
Figure 15B:
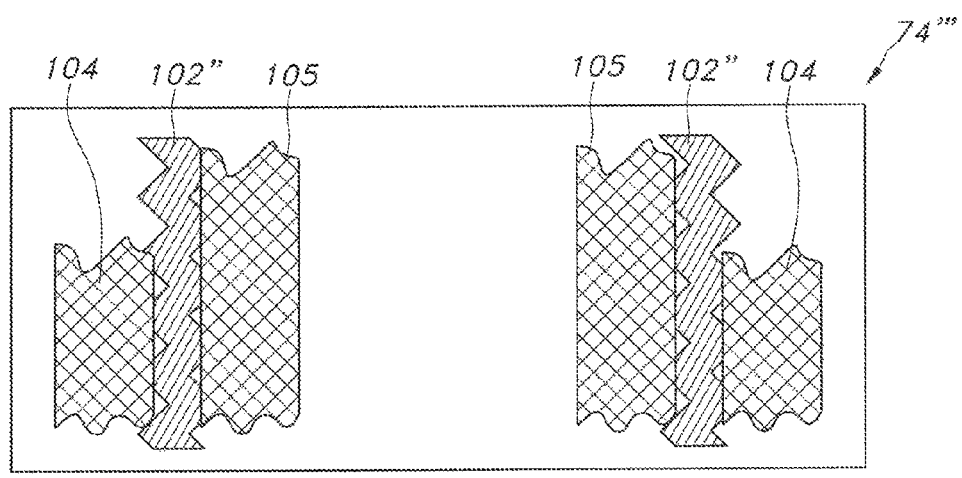
Figure 15C:
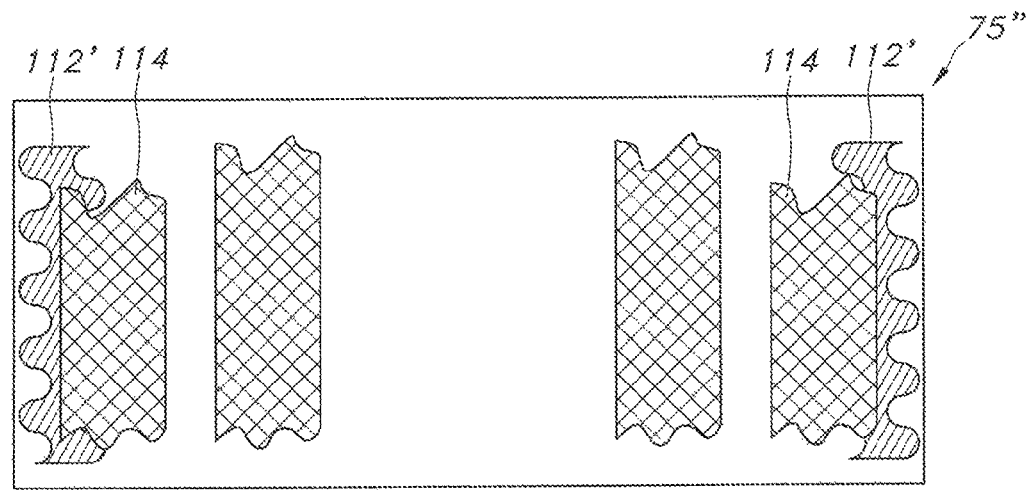
Figure 15D:
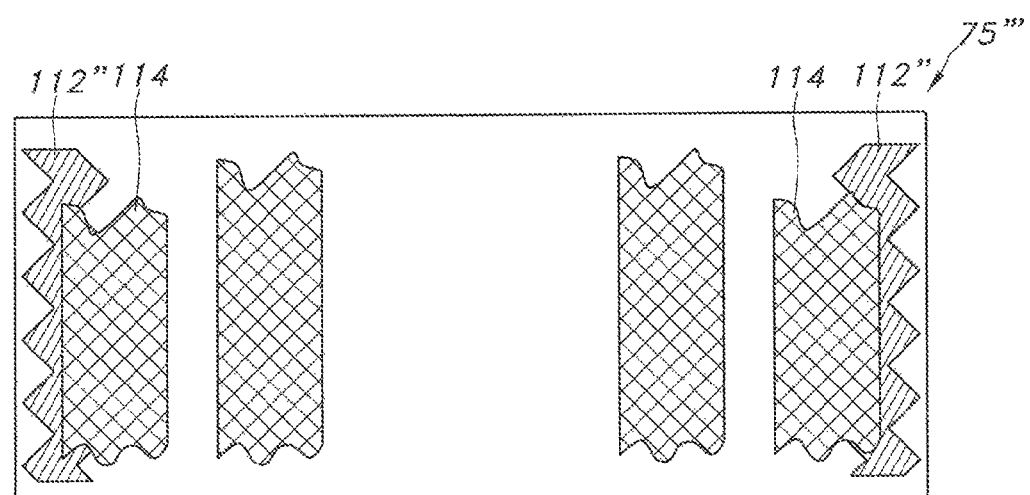

This results in the effect, also furthermore shown with reference to FIG. 14a and FIG. 14b, that upon displacement of the coil-shaped conductor tracks 111 and 113 relative to one another, the total capacitance of the antenna does not change or changes only insignificantly, since although on one side, for example, in the case of the displacement illustrated in FIG. 14b, the capacitance decreases (left-hand side), on the other side of the film element the capacitance correspondingly increases (left-hand side) and the total capacitance thus remains constant.

FIG. 15a to FIG. 15d then show variations of the exemplary embodiments according to FIG. 11a to FIG. 14b in which conductor track sections, namely the conductor track sections 102 and 112, are substructured and are shaped as substructured conductor track sections 102', 102'', 112' and 112''. In this case, the substructuring of the conductor track sections is preferably chosen such that the conductor tracks are shaped in wavy fashion and/or in zigzag fashion at least in partial regions of the conductor track section. As a result, the effective length of the conductor tracks 101 and 111 can be lengthened in a targeted manner, as a result of which the resistance of the conductor tracks increases. With an increased resistance, the bandwidth of the antenna can be increased. In conjunction with the complete or partial overlapping with the conductor tracks 103 and 113—as set out in the exemplary embodiments according to FIG. 10*a* to FIG. 14*b*—as a result of the substructuring, in particular with a wavy and/or zigzag configuration of the conductor tracks, the capacitance that arises as a result of the overlap can also be reduced, as a result of which the resonant frequency of the antenna can be increased. As a result of the substructuring of the conductor track sections, therefore, the antenna structure can also be set precisely to the requirements with regard to bandwidth, resonant frequency by means of targeted influencing of the parameters of electrical resistance, inductance and capacitance.

Figure 16A:
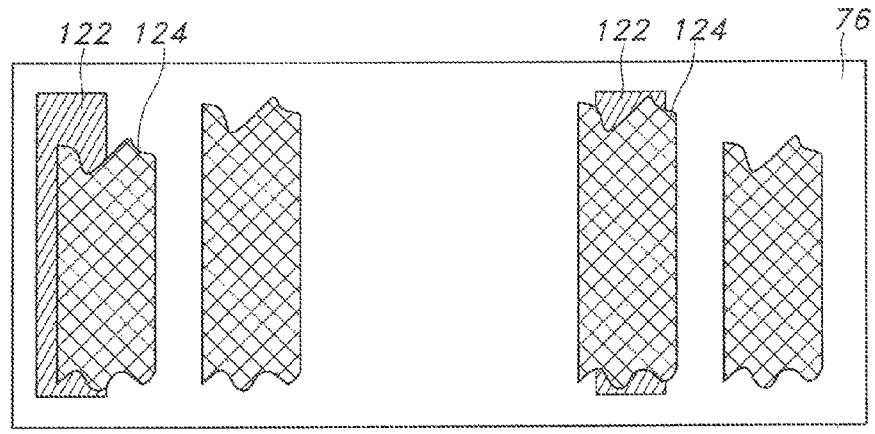
FIG. 16a and FIG. 16b show illustrations for clarifying the mutual overlap of the first and second electrically conductive layers of the film element according to FIG. 3 for a further exemplary embodiment.
Figure 16B:
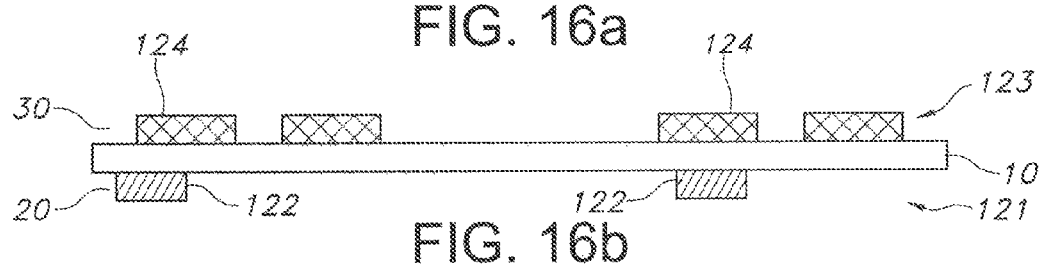
Figure 17A:
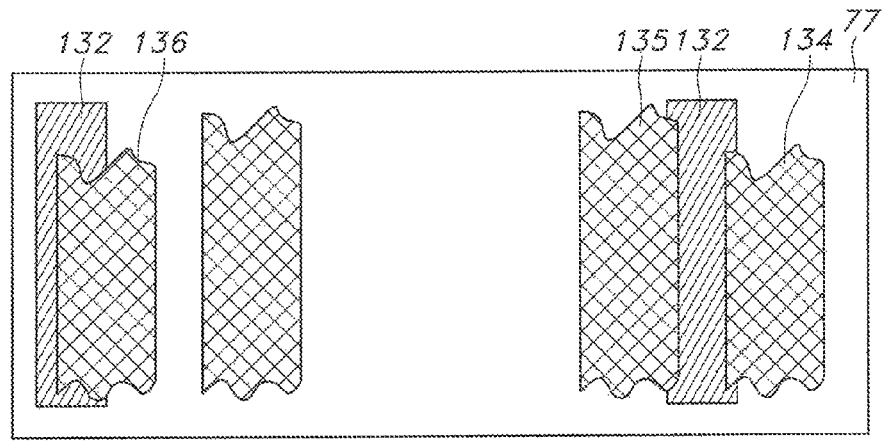
FIG. 17a and FIG. 17b show illustrations for clarifying the mutual overlap of the first and second electrically conductive layers of the film element according to FIG. 3 for a further exemplary embodiment.
Figure 17B:
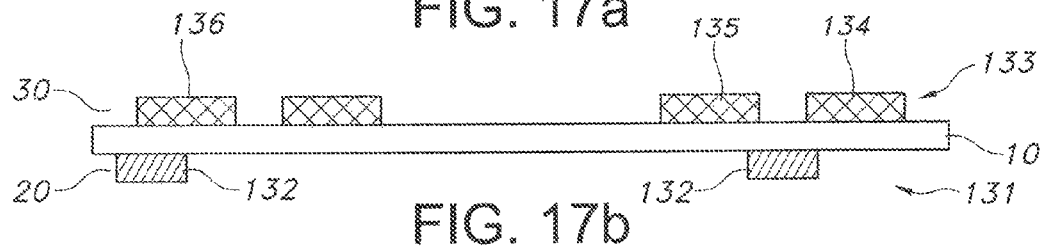

Furthermore, it is also possible to combine the embodiments according to FIG. 5 to FIG. 15*d* with one another. Thus, by way of example, FIGS. 16*a* and 16*b* clarify an embodiment in which a coil-shaped conductor track 123 having a conductor track section 124 is impressed into the electrically conductive layer 30 and a coil-shaped conductor track 121 having a conductor track section 122 is impressed into the electrically conductive layer 20. FIG. 17*a* and FIG. 17*b* clarify an embodiment in which a coil-shaped conductor track 133 having a conductor track section 136 and a conductor track section having two partial sections 135 and 134 is impressed into the electrically conductive layer 30 and a coil-shaped conductor track having a conductor track section 132 is impressed into the electrically conductive layer 20.

Figure 4:
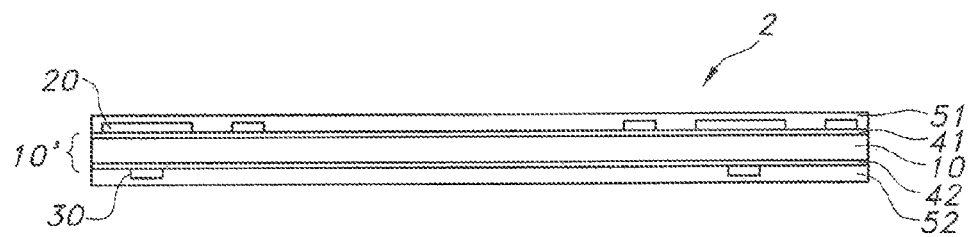
FIG. 4 shows a schematic sectional illustration, not true to scale, of a film element according to the invention for a further exemplary embodiment of the invention.

A further embodiment of the invention is clarified in FIG. 4. FIG. 4 shows a film element 2 comprising the carrier layer 10, the decorative layers 41 and 42, the electrically conductive layers 20 and 30 and the protective layers 51 and 52. With regard to the configuration of the layers 10, 20, 30, 41, 42, 51 and 52, reference is made to the above explanations, in particular to the explanations concerning FIG. 1 to FIG. 3 and FIG. 5 to FIG. 7. In the exemplary embodiment according to FIG. 4, therefore, the electrically conductive layers 20 and 30 are applied to a multilayer carrier layer 10' formed by the carrier layer 10 and the decorative layers 41 and 42 applied to both sides of the carrier layer 10. In this case, a particularly preferred embodiment of the carrier layer consists in the fact that an optically active surface relief is replicated into the carrier layer 10 on both sides and, as a result of the subsequent application of the (metallic) electrically conductive layers 20 and 30 in the regions in which the metallic layers 20 and 30 are provided, the electrically conductive layers 20 and 30 provide a reflection layer which makes visible the optically variable effect generated by the optically active surface structure. As a result, a security feature that is difficult to counterfeit can be integrated in the film element 2 in a simple manner. Since any change in the metallic layers 20 and 30 influences the electrical properties of the antenna structure, on the one hand, and the optical properties of the film element, on the other hand, optical security element and contactlessly readable security element intermesh and mutually protect each other.

The invention claimed is:

1. A multilayer film element comprising a flexible dielectric carrier layer having a layer thickness of less than 800 μm, comprising a first electrically conductive layer, in which a first coil-shaped conductor track is shaped in a first region of the film element, comprising a second electrically conductive layer, in which a second coil-shaped conductor track is shaped in the first region, wherein the dielectric carrier layer is arranged between the first and second electrically conductive layers and the first and second conductor tracks overlap at least in regions and are coupled to one another to form an antenna structure, and wherein a first conductor track section comprising at least a three-quarter turn of the first coil-shaped conductor track overlaps at least in regions a second conductor track section comprising at least a three-quarter turn of the second coil-shaped conductor track with respect to a direction perpendicular to the plane spanned by the carrier layer, wherein, in a region comprising t turns of the first conductor track section, the first conductor track section in each case at least partly overlaps at least two partial sections of the second conductor track section, wherein the two partial sections are assigned to different turns of the second coil-shaped conductor track and t≥¼.

2. The multilayer film element as claimed in claim 1, wherein the first conductor track section overlaps at least in regions the second conductor track section with respect to a direction perpendicular to the plane spanned by the carrier layer in such a way that the area dimension of the overlap area of the first and second conductor track sections upon displacement of the first coil-shaped conductor track in a first direction, lying in the plane spanned by the carrier layer, by 100 μm remains constant.

3. The multilayer film element as claimed in claim 1, wherein in said region, the distance between the two partial sections of the second conductor track section is less than the width of the first conductor track section by at least the value r and, in said region, the sum of the widths of the two partial sections and the distance between the partial sections is greater than the width of the first conductor track section by at least the value r, where r≥100 μm and the width of each of the partial sections is ≥r.

4. The multilayer film element as claimed in claim 1, in a region comprising t turns of the first conductor track section, the first conductor track section completely overlaps the second conductor track section and in this region along the first conductor track section in at least one first direction, lying in the plane spanned by the carrier layer, the extent of the second conductor track is less than the extent of the first conductor track by the value r, where t≥¼ and r≥100 μm.

5. The multilayer film element as claimed in claim 4, wherein along the first conductor track section in a second direction, lying in the plane spanned by the carrier layer, the extent of the second conductor track is at least 50 μm less than the extent of the first conductor track, wherein the first and second directions form a right angle.

6. The multilayer film element as claimed in claim 4, wherein, along the first conductor track section in the second direction, the extent of the second conductor track is between 200 and 400 μm less than the extent of the first conductor track.

7. The multilayer film element as claimed in claim 4, wherein, along the first conductor track section, the difference in the extent of the first and second conductor tracks in the first direction is greater than 20%, than the difference in the extent of the first and second conductor tracks in the second direction.

8. The multilayer film element as claimed in claim 1, wherein the first conductor track section completely overlaps the second conductor track section with respect to the direction perpendicular to the plane spanned by the carrier layer and, along the first conductor track section in the first direction, the extent of the second conductor track is less than the extent of the first conductor track by at least 100 μm.

9. The multilayer film element as claimed in claim 1, wherein, in a region comprising t turns of the first conductor track section, along the first conductor track section, the first and second conductor track sections partly overlap, the external diameters of the respective turn of the first coil-shaped conductor track and of the second coil-shaped conductor track in at least one first direction, lying in the plane spanned by the carrier layer, differ by the value r and the widths of the first coil-shaped conductor track and of the second coil-shaped conductor track are in each case greater than twice the value r, where t≥¼ and r≥100 µm.

10. The multilayer film element as claimed in claim 9, wherein the width of the coil-shaped conductor track having the larger external diameter of the respective turn is less than or equal to the width of the coil-shaped conductor track having the smaller external diameter of the respective turn.

11. The multilayer film element as claimed in claim 1, wherein t is chosen from the range ¾ to 1.

12. The multilayer film element as claimed in claim 1, wherein t≥¾.

13. The multilayer film element as claimed in claim 1, wherein r is ≥400 µm.

14. The multilayer film element as claimed in claim 1, wherein r≤400 µm.

15. The multilayer film element as claimed in claim 1, wherein the first coil-shaped conductor track and the second coil-shaped conductor track have the same turns direction.

16. The multilayer film element as claimed in claim 1, wherein the first and/or second coil-shaped conductor track are/is substructured in the first conductor track section and/or in the second conductor track section, and are/is substructured in zigzag fashion or in wavy-line-shaped fashion.

17. The multilayer film element as claimed in claim 16, wherein the first and/or second conductor track are/is substructured in the first conductor track section and/or in the second conductor track section in accordance with a periodic substructuring function, wherein the period of the substructuring function is less than 5 mm.

18. The multilayer film element as claimed in claim 1, wherein the first conductor track has a third conductor track section, which adjoins the first conductor track section, and the conductor track width of the third conductor track section is less than the conductor track width of the first conductor track section.

19. The multilayer film element as claimed in claim 18, wherein the conductor track width of the third conductor track section is less than the conductor track width of the first conductor track section by at least 100 µm.

20. The multilayer film element as claimed in claim 18, wherein the third conductor track section comprises at least one turn of the first coil-shaped conductor track.

21. The multilayer film element as claimed in claim 18, wherein the third conductor track section, with respect to the coil-shaped embodiment of the first conductor track as inner conductor track section, is adjacent to the first conductor track section.

22. The multilayer film element as claimed in claim 18, wherein the first conductor track section comprises the outermost three-quarter turn of the first coil-shaped conductor track.

23. The multilayer film element as claimed in claim 18, wherein the conductor track width of the third conductor track section is between 10 and 50% of the conductor track width of the first conductor track section.

24. The multilayer film element as claimed in claim 1, wherein the first conductor track section has a conductor track width of 0.5 to 5 mm.

25. The multilayer film element as claimed in claim 1, wherein, along the first conductor track section in the first direction, the extent of the second conductor track is between 200 and 400 µm less than the extent of the first conductor track.

26. The multilayer film element as claimed in claim 1, wherein the first direction is the longitudinal direction of the carrier layer.

27. The multilayer film element as claimed in claim 1, wherein the first and second electrically conductive layers have a layer thickness of between 1 and 18.

28. The multilayer film element as claimed in claim 1, wherein the first and second electrically conductive layers are structured by means of a printing method.

29. The multilayer film element as claimed in claim 1, wherein the layer thickness of the first and/or of the second electrically conductive layer is not constant.

30. The multilayer film element as claimed in claim 1, wherein the first and second conductor tracks are connected to one another via at least one electrically conductive plated-through hole through the carrier layer.

31. The multilayer film element as claimed in claim 1, wherein the first and second conductor tracks are capacitively and/or inductively coupled to one another.

32. The multilayer film element as claimed in claim 1, wherein the first and/or second conductor track in each case have/has between one and four turns, preferably between two and three turns.

33. The multilayer film element as claimed in claim 1, wherein a first and a second electrode area are formed in the first and/or in the second electrically conductive layer, said electrode areas in each case being electrically connected to the first and/or second conductor track.

34. The multilayer film element as claimed in claim 33, wherein a first and a second electrode area are formed both in the first and in the second electrically conductive layer, wherein the first electrode areas at least partly overlap and are connected to one another via an electrically conductive plated-through hole, and the second electrode areas at least partly overlap and are connected to one another via an electrically conductive plated-through hole.

35. The multilayer film element as claimed in claim 33, wherein the first electrode area is connected to the first conductor track and the second electrode area is connected to the second conductor track.

36. The multilayer film element as claimed in claim 33, wherein a third conductor track is shaped in the first and/or the second electrically conductive layer, said third conductor track being connected to the first or second electrode area and being capacitively and/or inductively coupled to the first and/or second conductor track.

37. The multilayer film element as claimed in claim 36, wherein the third conductor track extends over at least 40% of the width of the multilayer film element.

38. The multilayer film element as claimed in claim 33, wherein the multilayer film element has an electrical circuit, which is electrically connected to the first and second electrode areas.

39. The multilayer film element as claimed in claim 33, wherein the first and second electrode areas in each case have a size of in each case at least 2 mm$^2$.

40. The multilayer film element as claimed in claim 33, wherein the electrode areas are arranged in a corner of the film element.

41. The multilayer film element as claimed in claim 1, wherein the film element has a card-type shaping.

42. The multilayer film element as claimed in claim 1, wherein the carrier layer has a layer thickness of between 250 µm and 12 µm.

43. The multilayer film element as claimed in claim 1, wherein the first and second electrically conductive layers are applied on opposite surfaces of the carrier layer.

44. The multilayer film element as claimed in claim 1, wherein the carrier layer has a plastic film and a decorative layer.

45. The multilayer film element as claimed in claim 44, wherein the decorative layer in conjunction with the first and/or second electrically conductive layer provides an optically variable security element.

46. The multilayer film element as claimed in claim 1, wherein a decorative layer is arranged between the first and second conductor tracks and/or on that side of the first and/or second conductor track which is remote from the carrier layer.

47. The multilayer film element as claimed in claim 46, wherein the decorative layer is a layer having a microscopic or macroscopic surface relief having a diffractive optical effect or a surface relief in the form of lens structures, matt structures or blazed grating, a thin-film layer system, a liquid crystal layer or a layer comprising optically active pigments, and the decorative layer is arranged in the film element in such a way that it at least partly overlaps the first and/or second conductor track.

48. The multilayer film element as claimed in claim 1, wherein a relief structure that generates an optically variable effect is impressed into the first and/or second conductor track.

49. A method for producing a multilayer film element comprising the following steps:
providing a flexible dielectric carrier layer having a layer thickness of less than 800 μm;
applying a first electrically conductive layer, in which a first coil-shaped conductor track having a first conductor track section comprising at least a three-quarter turn of the coil-shaped first conductor track is shaped in a first region of the film element, to a first surface of the carrier layer; and
applying a second electrically conductive layer, in which a second coil-shaped conductor track having a second conductor track section comprising at least a three-quarter turn of the second coil-shaped conductor track is shaped in the first region, to a second surface of the carrier layer, said second surface lying opposite the first surface, in such a way that the first and second conductor tracks overlap at least in regions and are coupled to one another to form an antenna structure, wherein, in a region comprising t turns of the first conductor track section, the first conductor track section in each case at least partly overlaps at least two partial sections of the second conductor track section, wherein the two partial sections are assigned to different turns of the second coil-shaped conductor track and $t \geq 1/4$.

50. The method for producing a multilayer film element as claimed in claim 49, wherein the first conductor track section overlaps at least in regions the second conductor track section with respect to a direction perpendicular to the plane spanned by the carrier layer in such a way that the area dimension of the overlap area of the first and second conductor track sections upon displacement of the first coil-shaped conductor track in a first direction, lying in the plane spanned by the carrier layer, by 100 μm remains constant.

51. The method for producing a multilayer film element as claimed in claim 49, wherein for applying the first and/or second electrically conductive layer, in a first step, an electrically conductive base layer structured by means of a printing method is applied and a galvanic reinforcement layer is then applied to the base layer, wherein the base layer and the galvanic reinforcement layer consist of different materials.

52. The method for producing a multilayer film element as claimed in claim 51, wherein the base layer is applied to the carrier layer by means of a printing method.

53. The method for producing a multilayer film element as claimed in claim 52, wherein the base layers are printed onto the opposite surfaces of the carrier layer by means of two printing units synchronized with one another.

* * * * *

UNITED STATES PATENT AND TRADEMARK OFFICE
CERTIFICATE OF CORRECTION

PATENT NO. : 8,830,138 B2  
APPLICATION NO. : 13/143005  
DATED : September 9, 2014  
INVENTOR(S) : Peters et al.

Page 1 of 1

It is certified that error appears in the above-identified patent and that said Letters Patent is hereby corrected as shown below:

In the Specification

Column 8, lines 53-54: now reads "preference between and 50 μm"

should read -- preference between 75 and 50 μm --

Column 10, lines 34-35: now reads "carrier layer and thus"

should read -- carrier layer 10 and thus --

Column 19, line 40: now reads "carrier layer consists in"

should read -- carrier layer 10 consists in --

Signed and Sealed this
Fifteenth Day of September, 2015

Michelle K. Lee
*Director of the United States Patent and Trademark Office*